(12) United States Patent
Kokubu et al.

(10) Patent No.: US 6,177,879 B1
(45) Date of Patent: Jan. 23, 2001

(54) BATTERY RENTAL SYSTEM AND APPARATUS

(75) Inventors: Mamoru Kokubu, Kawagoe; Tomohide Shimizu, Iruma, both of (JP)

(73) Assignee: Honda Giken Kogyo Kabushiki Kaisha, Tokyo (JP)

(*) Notice: Under 35 U.S.C. 154(b), the term of this patent shall be extended for 0 days.

(21) Appl. No.: 09/071,774

(22) Filed: May 4, 1998

(30) Foreign Application Priority Data

| May 9, 1997 | (JP) | 9-119549 |
| May 9, 1997 | (JP) | 9-119559 |
| May 9, 1997 | (JP) | 9-119587 |
| May 9, 1997 | (JP) | 9-119594 |

(51) Int. Cl.[7] .................................................. G06F 7/04
(52) U.S. Cl. ................. 340/825.33; 340/432; 348/134
(58) Field of Search ..................... 340/825.33, 432; 320/6; 348/134; 70/58, 63

(56) References Cited

U.S. PATENT DOCUMENTS 5,278,538 * 1/1994 Ainsworth et al. .............. 340/427
5,410,326 * 4/1995 Goldstein ........................ 348/134
5,594,318 * 1/1997 Nor et al. ........................ 320/2
5,694,019 * 12/1997 Uchida et al. ................... 320/6

FOREIGN PATENT DOCUMENTS 2-93796  *  4/1990  (JP).
6-68095  * 11/1994  (JP).
7-325959 * 12/1995  (JP).

* cited by examiner

Primary Examiner—Michael Horabik
Assistant Examiner—M Shimizu

(57) ABSTRACT

After confirmation that a user is an authorized user by bringing a user certification into proximity to a user discriminating device, following the guidance of a touch panel display device, a battery is selected, and the battery, for which a lock thereof is unlocked, is taken out from a battery supply device. Thereafter, the battery is installed in a two electric wheeled vehicle in a parking apparatus, and the two wheeled electric vehicle is unlocked and used.

14 Claims, 22 Drawing Sheets

F I G. 12
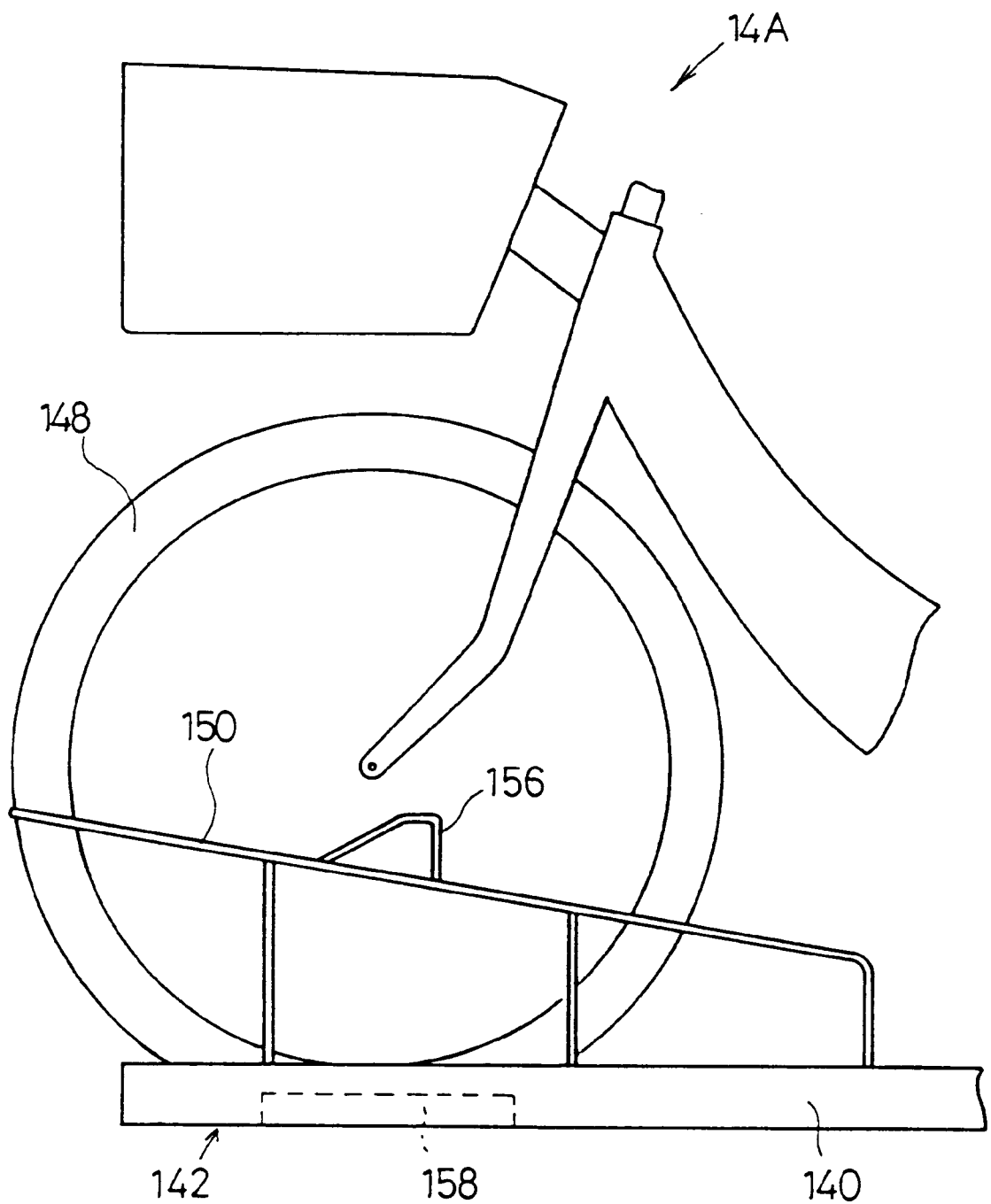

FIG. 21

BATTERY RENTAL INFORMATION

| | CAN | ENT |

| 1 | 2 | 3 | 4 | 5 |
|---|---|---|---|---|
| 6 | 7 | 8 | 9 | 10 |

BATTERY RENTAL SYSTEM AND APPARATUS

BACKGROUND OF THE INVENTION

1. Field of the Invention

The present invention relates to a battery rental system and apparatus by which a battery is rented to a specified user.

2. Description of the Related Art

Numerous vehicle rental systems for rental of bicycles or other vehicles exist in accordance with prior techniques. For example, for an automobile rental system, the general practice is one in which a customer completes the necessary documents at the rental company and receives a key, and after rental and use of a desired automobile for a predetermined time period, the vehicle is returned to the rental company. In this case, the handling of receipt and delivery of the rental contract and key, and accounting calculations necessary upon return of the vehicle, result in considerable complexity for the customer and rental company employees alike.

Thus, for example, in a system disclosed by Japanese Laid-Open Patent Publication 6-68095, a distinguishing means, such as a magnetic card which is in the possession of a member, is read by an evaluating means installed in the automobile, thereby judging whether use of the vehicle is valid or not, and if such use is possible, the door is unlocked and rental of the vehicle is permitted. On the other hand, the position of the concerned vehicle can be tracked by a central control apparatus via an automobile position discernment device. In this case, simplification of the rental procedure can be achieved, and since the position of the vehicle can be discerned, an advantage is attained in that the degree of freedom in returning the vehicle can be improved.

Further, in a system disclosed by Japanese Laid-Open Patent Publication 7-325959, in a rental station in which plural portable telephones are received, a card possessed by the user is employed, and a desired portable telephone is rented, wherein the rental fee therefor is calculated based on a summed value of use units which is internally stored within the portable telephone.

However, according to such conventional techniques, a structure is not provided in which a certain type, or the like, of vehicle or portable phone, selectable by the user, can be easily and conveniently chosen.

On the other hand, in Japanese Laid-Open Patent Publication 2-93796, an apparatus is disclosed enabling a battery owned by a user to be electrically charged for a fee.

However, there is no discussion concerning battery management. Much less, no conventional technique is seen in which a system for rental of detachable batteries is disclosed.

More specifically, in electric vehicles, such as electric automobiles and electric two wheeled vehicles, batteries are installed therein, wherein a driving force or an assisted propulsive power is provided from such a power source. Naturally, it is required that the battery be charged beforehand.

However, such batteries are relatively high in cost, and it is a fact that charging thereof requires a considerable time. Accordingly, a system and apparatus are desired in which batteries, which are already in a charged stated, can be optionally supplied. Further, for theft prevention, it is necessary to have a structure which permits rental of batteries to only specified users.

SUMMARY OF THE INVENTION

A general object of the present invention is to provide a battery rental system and apparatus in which a battery which is charged to a desired condition can be extremely easily rented without the intervention of other human operators.

Another object of the invention is to provide a battery rental system and apparatus in which batteries can be charged, and which permits rental thereof by multiple users.

A further object of the invention is to provide a battery supply device in which batteries are charged, and equipped with a theft prevention mechanism which permits rental thereof by only specified users.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 12. is an explanatory view showing the relation between a position determining mechanism and a large sized two wheeled electric vehicle;

FIG. 21 is an explanatory view of battery rental information as displayed on a display device including a touch panel;

DESCRIPTION OF THE PREFERRED EMBODIMENTS

Figure 1:
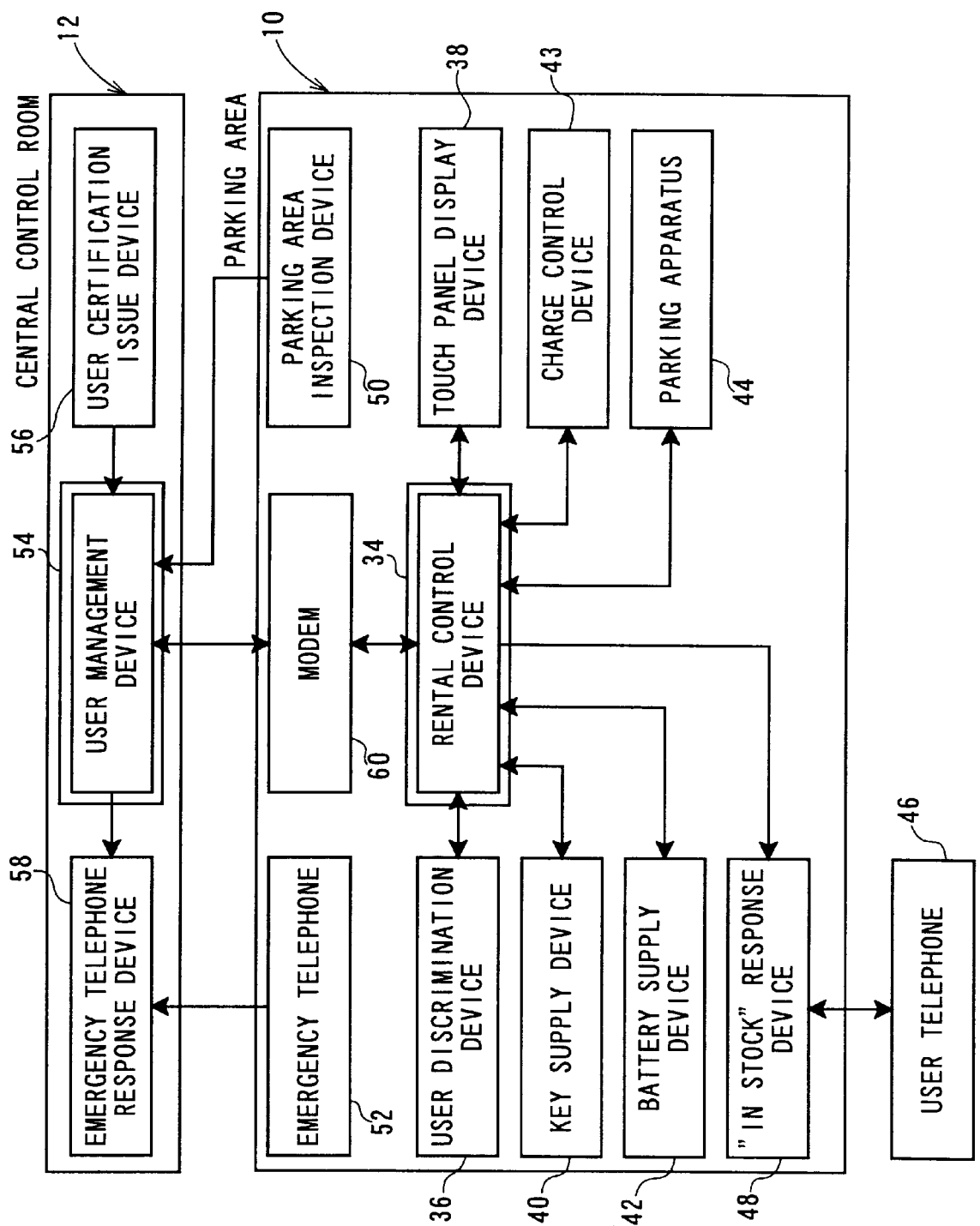
FIG. 1 is a structural block view of a vehicle rental system in which the battery rental system and apparatus of the present invention is utilized.

FIG. 1 is an overall control block view of the vehicle rental system in accordance with an embodiment of the present invention.

The vehicle rental system is equipped with a parking area 10 in which a plurality of electric vehicles are parked in a rentable condition, and a central control room 12 for managing the condition of the parking area 10 as well as vehicle users.

Figure 2:
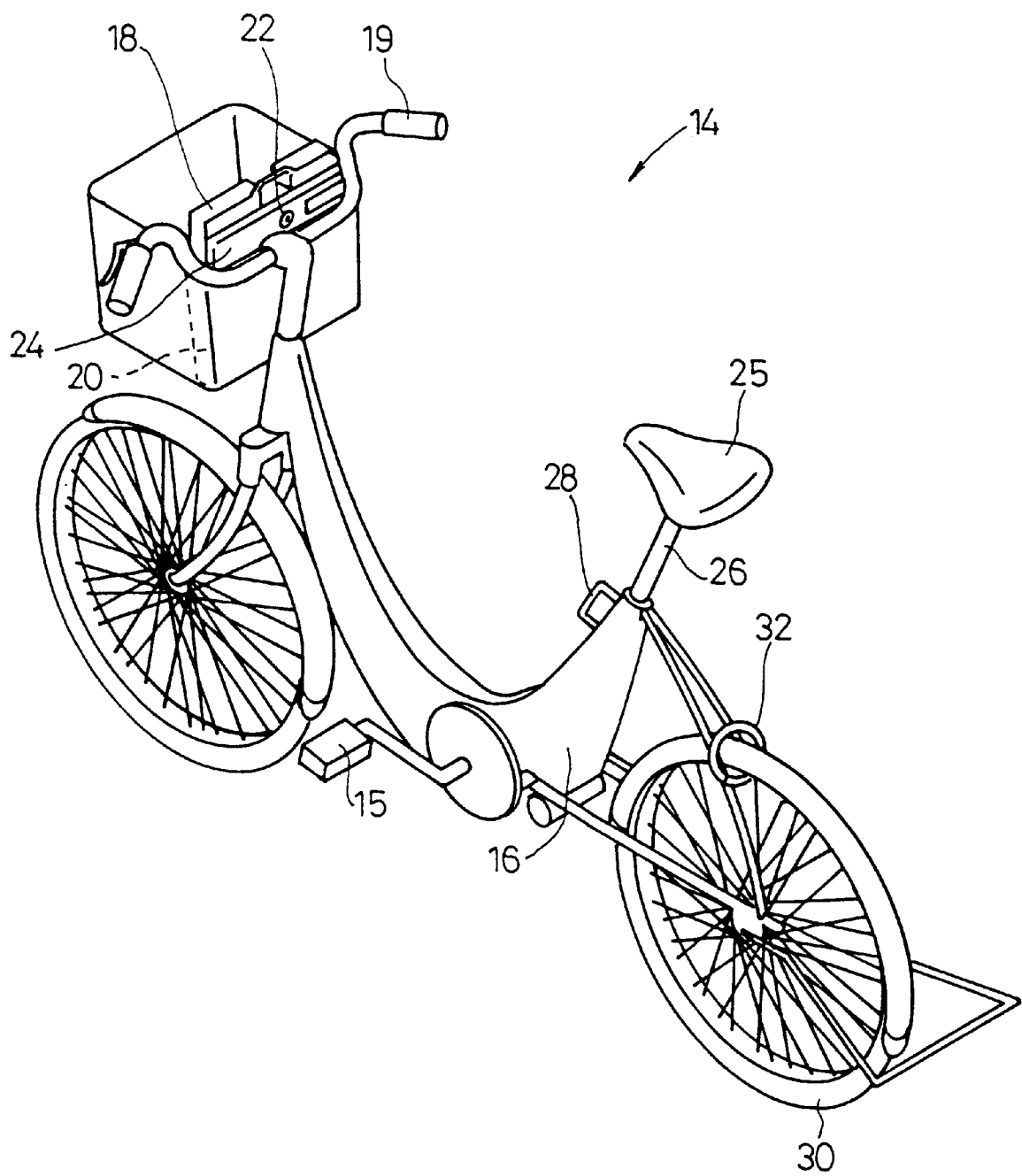
FIG. 2 is an explanatory view of a two wheeled electric vehicle.

Herein, FIG. 2 shows a two wheeled electric vehicle 14 which is an example of an electric vehicle which may be rented using the present rental system. The two wheeled electric vehicle 14 is equipped with an assist drive unit 16 which assists a driving power provided by a pedal 15, and a battery 18 for supplying electric power to the assist drive unit 16. The battery 18 is detachably accommodated in a battery case 20 attached to the front of a handle 19. In order to prevent theft of the accommodated battery, the battery case 20 includes a lock 24 equipped with a lock mechanism 22. Further, a C-channel coupling member 28 which is locked by a circle lock (discussed hereinafter) installed at the parking area 10 is disposed on a main frame 26 underneath the saddle 25. Furthermore, a circle lock 32 for preventing theft at an optional parking space for the two wheeled electric vehicle is disposed around the rear wheel 30. The lock mechanism 22 of the battery 18, the circle lock installed at the parking area 10, and the circle lock 32 on the rear wheel, can all be unlocked using the same key.

Figure 3:
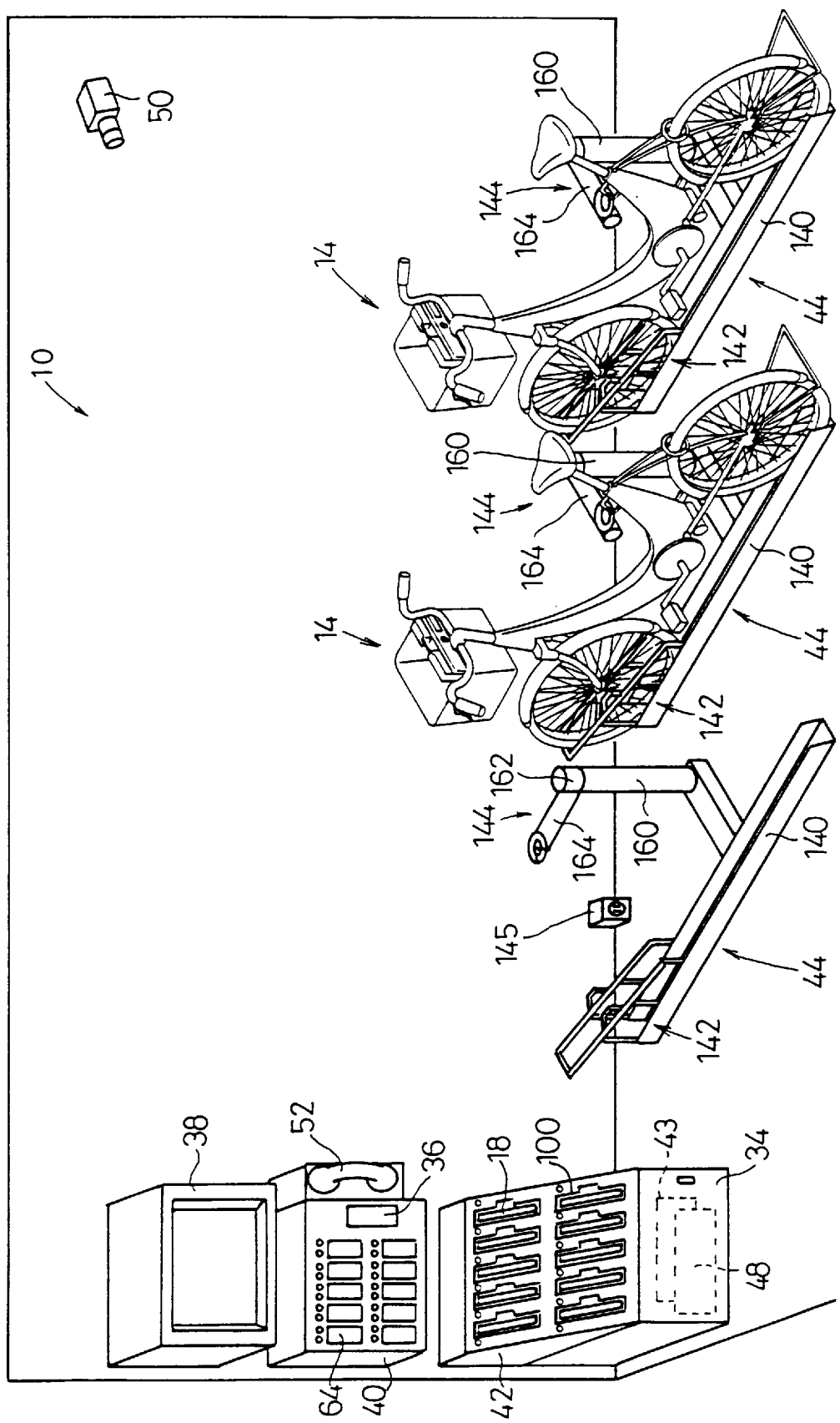
FIG. 3 is a structural view of a parking area.

The parking area 10, as shown in FIGS. 1 and 3, is equipped with a rental return control device 34 which controls overall rental processing as well as return processing of two wheeled electric vehicles at the parking area 10, and a user discrimination device 36 for discerning users from a user certificate such as a non-contact type IC card is connected to the rental return control device 34. As the user discrimination device, apart from a non-contact type IC card, a device in which a recorded fingerprint or eye pattern of the user is discriminated may also be used. A display device 38 having a selectable touch panel thereon (functioning as a selection means or a combined display/selection means) is connected to the rental return control device 34. The touch panel display device 38 displays selection information pertaining to selectable two wheeled electric vehicles, whereby the user selects a two wheeled electric vehicle 14 based on such selection information.

A key supply device 40 holding a plurality of keys for the two wheeled electric vehicles 14 parked in the parking area and enabling selection of a key belonging to a desired two wheeled electric vehicle 14, and a battery supply device 42 holding a plurality of batteries 18 are connected to the rental return control device 34. Further, a charge control device 43 for controlling charging of internal battery type two wheeled electric vehicles, a parking apparatus 44 for parking in a locked state a plurality of two wheeled electric vehicles, and a stock response device 48 responsive to requests from a user telephone 46 for performing a response of the in-stock state of a two wheeled electric vehicle at a given parking space 10 are also connected to the rental return control device 34.

A parking area inspection device 50 made up of a CCD camera or the like for inspecting the condition of the parking area 10, and an emergency telephone 52 are disposed in the parking area 10.

The central control room 12, as shown in FIG. 1, includes a user management device 54, equipped with user registration functions, account settlement functions and management functions for the parking area 10, a user certification issuing device 56 for issuing a user certificate made up of a non-contact type IC card or the like, and an emergency telephone response device 58 for responding to requests from the emergency telephone 52 installed at the parking area 10. The user management device 54 and the rental return control device 34 at the parking area 10 perform transmittal and receipt of information via a modem 60.

Next, detailed explanation shall be given of specific features of the key supply device 40, the battery supply device 42 and the parking apparatus 44 disposed in the parking area 10.

Figure 4:
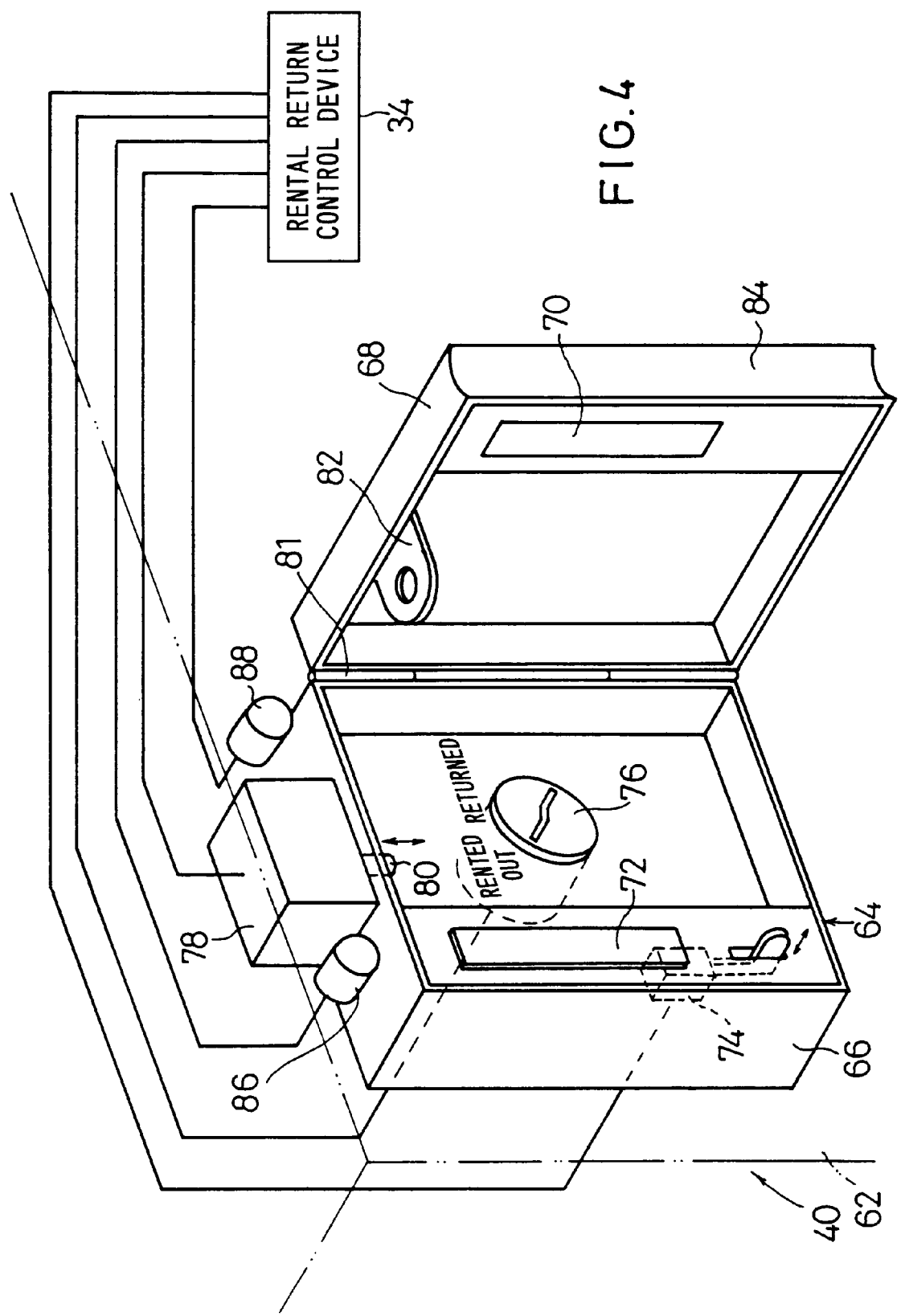
FIG. 4 is a structural view of a key supply device.

The key supply device 40, as shown in FIG. 4, comprises a plurality of key boxes 64 disposed in a casing 62 and holding therein keys for the two wheeled electric vehicles 14. On a side of the interior of a main body 66, a magnet 72 for holding a receiving part 70 of a key door 68 in an attached and closed state is arranged, together with a sensor 74 made up of a microswitch or the like, for detecting a closed state of the key door 68. A key cylinder 76 with a key attached therein is arranged substantially in the center of the main body 66.

Further, the key cylinder 76 functions as a key discrimination means which is rotatable, only by a specified key, to positions for "rent out" and "returned" states. In this case, in place of the cylinder 76, other devices which can specify a given key, for example a CCD camera, laser scanner, or the like, can also by utilized as the key discrimination means.

A solenoid 78 is disposed on top of the man body 66, and an retractable rod 80 which is driven thereby is also constructed within the main body 66. On the other hand, on an upper part of the key door 68 which is attached via hinges 81 to the main body 66, a coupling member 82 is disposed which couples with the rod 80 when the key door 68 is in a closed state. Further, on a side part of the key door 68, a recess 84 is formed for facilitating opening and closing. Light emitting elements 86, 88 made up of LED's or the like, and which indicate rented out and returned states, are disposed on top of the key boxes 64 which are constructed as described above. In addition, the key cylinder 76, solenoid 78 and light emitting elements 86, 88 are respectively connected to the rental return control device 34.

Figure 5:
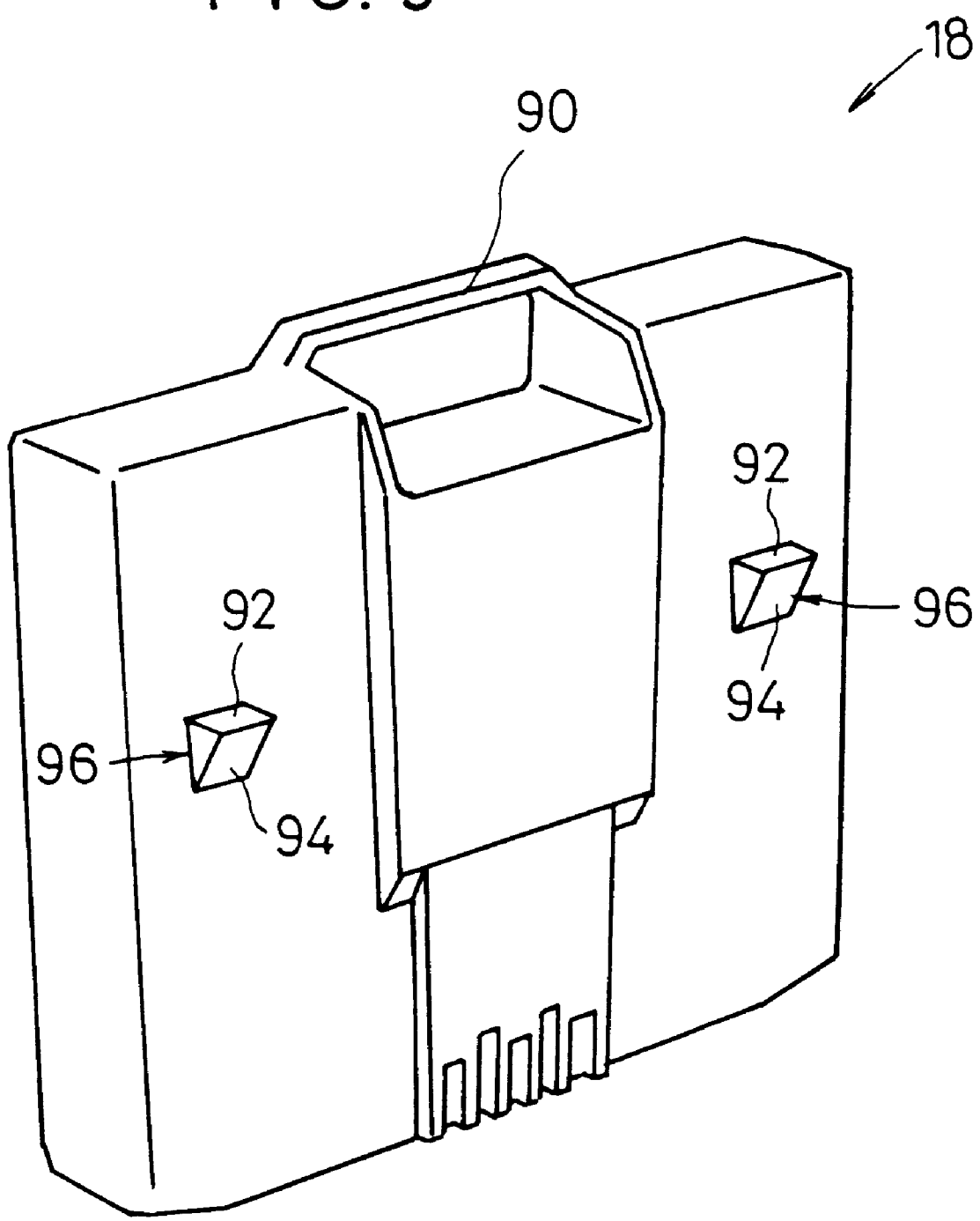
FIG. 5 is a structural view of a battery.

FIG. 5 shows a battery 18 which is to be accommodated in the two wheeled electric vehicle 14 and the battery supply device 42. Such a battery 18 is constructed as a box-shape, having a handle 90 on an upper part thereof, wherein unillustrated electrodes are disposed on a bottom part thereof opposite from the handle 90. Further, on a side portion, two projections 96 are provided, each which is formed by a flat coupling surface 92 which intersects with the side portion on a surface to one side of the handle 90, and a slanted surface 94 inclined with respect to the coupling surface 92 on a surface further separated from the handle 90.

Figure 6:
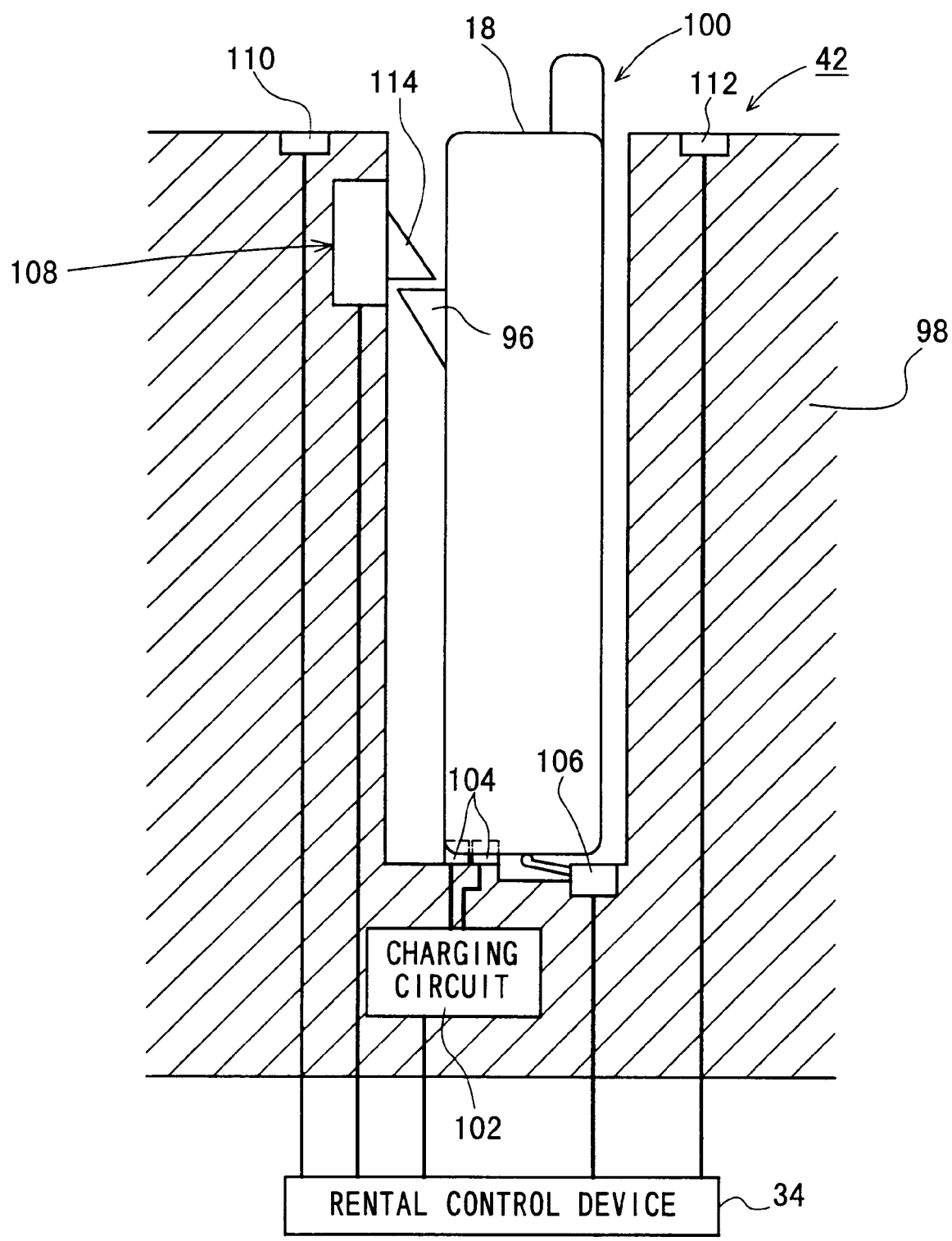
FIG. 6 is a cross-sectional view of a battery supply device.

In the battery supply device 42, as shown in FIG. 6, a plurality of receptacles 100 for accommodating a plurality of batteries 18 constructed as described above are disposed within a main body 98 (see FIG. 3). Electrodes 104 which connect to a charging circuit 102 are disposed at the bottom of each receptacle 100, together with a sensor 106, such as a microswitch, for detecting that a battery 18 is accommodated therein. In addition, a lock mechanism 108 is arranged on an interior side of the receptacle 100, preventing withdrawal of the battery 18 by engagement with the projections 96 disposed on the side of the battery 18. Further, a light emitting device 11 such as an LED showing the locked state of the battery 10, and a light emitting device 112 such as an LED displaying a charge state of the battery, are disposed at the opening of the receptacle. The charging circuit 102, sensor 106, lock mechanism 108 and light emitting elements 110, 112 are connected to the rental return control device 34.

Further, the rental return control device 34 detects the charge condition of the battery 18 based on a signal from the charging circuit 102.

The lock mechanism 108, which is disposed in the battery supply device 42, is constructed as shown in FIGS. 7 through 10. More specifically, the lock mechanism 108 comprises a claw member 114 for engaging one of the projections 96 disposed on a side of the battery 18, a holder 116 which supports the claw member 114, brackets 118 and 120 for supporting the holder 116, and a solenoid 112 which controls movement of the holder 116.

The claw member 114 has an inclined surface 124 in sliding attachment with the slanted surface 94 (see FIG. 5) of the projection 96 at a time when the battery 18 is accommodated in the receptacle 110, and a coupling surface 126 which couples to the coupling surface 92 of the projection 96, and which is attached to an opening 128 of the holder 116. The holder 116 has a stop member 130 projecting from one side thereof, the holder 116 being formed by one surface to which the claw member 114 is attached and an opposite arcuately shaped side surface. A ⊐-shaped (C-channel) bracket 118 is disposed on the arcuately shaped surface. Furthermore, an end of a substantially L-shaped bracket 120 engages the opening part 128 of the side surface of the holder 116 roughly perpendicularly to the stop member 130. In addition, between the surface of another end of the bracket 120 and the bracket 118, a spring 132 is arranged for maintaining the claw member 114 in the state shown by FIG. 8. On the other hand, a stopper 138 is attached to a rod 134 of the solenoid 122 making up the lock mechanism 108 through the spring 136. The stopper 138 engages the stop member 130 of the holder 116 in a condition in which the rod 134 is projected, for maintaining the claw member 114 in the state shown by FIG. 8.

A plurality of parking apparatuses 44, in which plural electric two wheeled vehicles 14 are parked, are disposed in the parking area 10. The parking apparatuses 44, as shown in FIG. 3, are each equipped with a guide rail 140 for determining the position of a lateral direction of the electric two wheeled vehicle 14, a position determining mechanism 142 for determining a longitudinal position of the vehicle, a lock mechanism 144 for locking the electric two wheeled vehicle 14, and an outlet 145 for charging unillustrated internal battery type electric two wheel vehicles which are parked at a given parking apparatus 44. Further, determination of whether or not an internal battery type electric two wheel vehicle is connected to the outlet 145, and the charging state thereof, are control by a charge control device 43 under management of the rental return control device 34.

Figure 11:
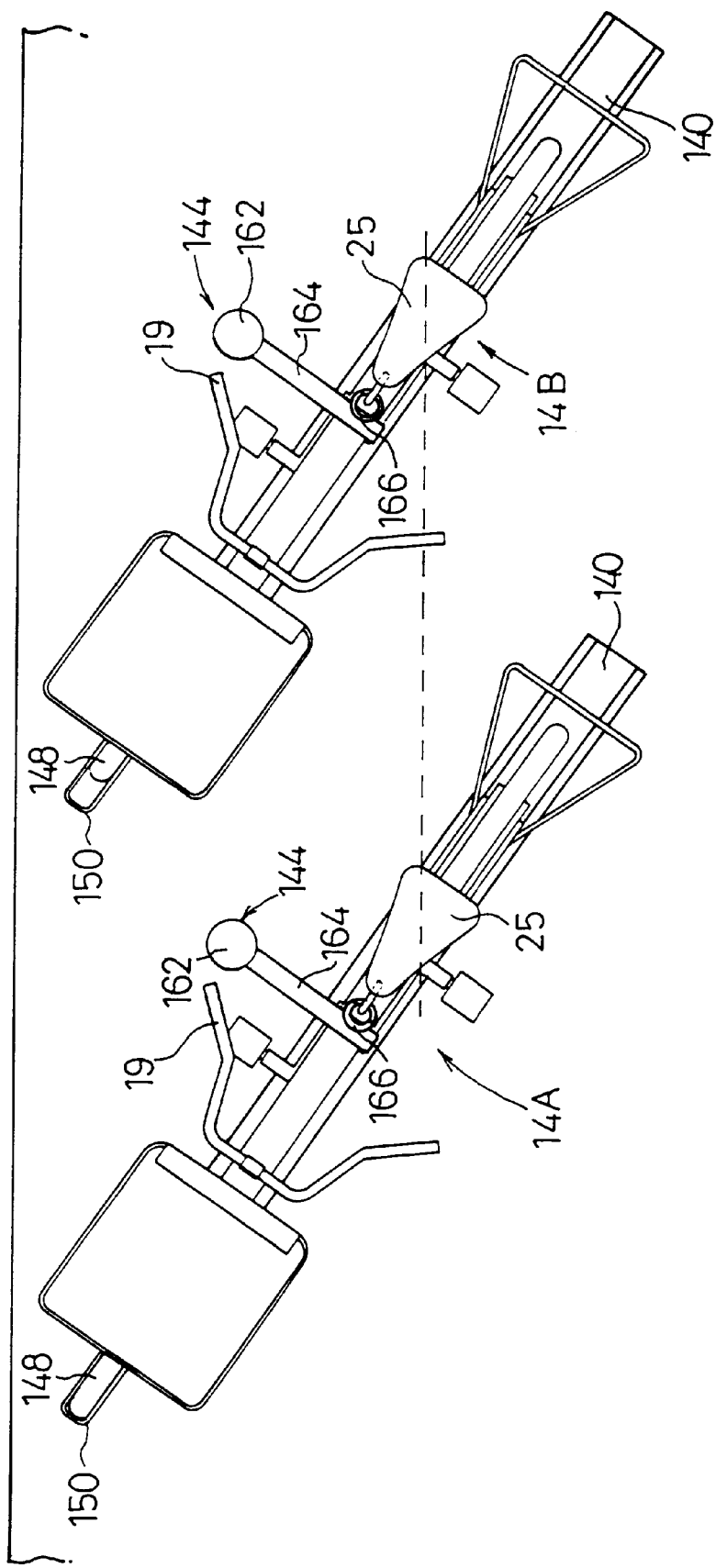
FIG. 11 is an explanatory plan view showing a parked state of a two wheeled electric vehicle in a parking area.
Figure 13:
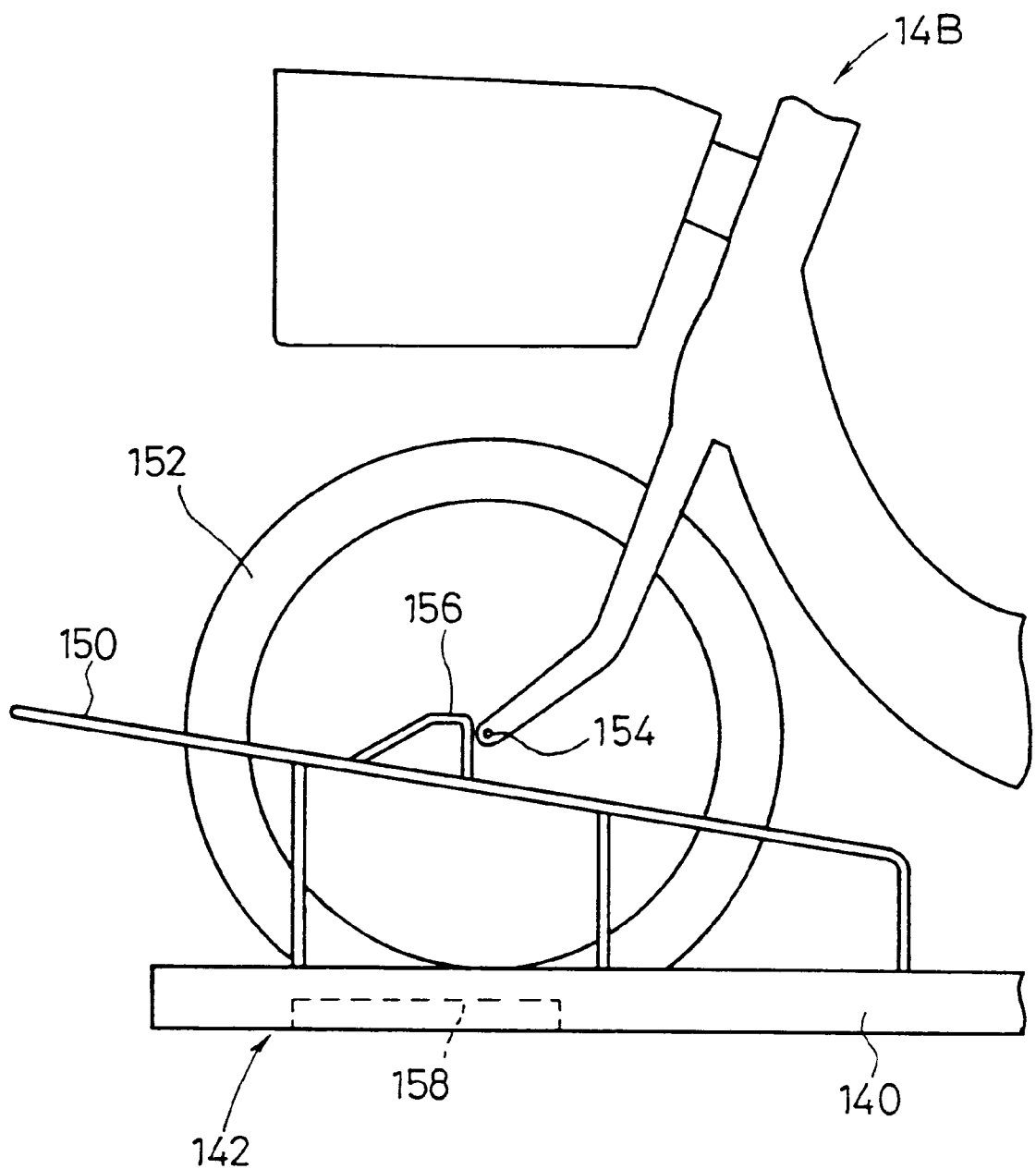
FIG. 13 is an explanatory view showing the relation between a position determining mechanism and a small sized two wheeled electric vehicle.

The guide rail 140, as shown in FIG. 11, is set at a fixed angular inclination with respect to a wall surface of the parking area 10. In this manner, by parking the two wheeled electric vehicles 10 at an inclination, the handles 19 of abutting parked two wheeled electric vehicles 14 do not interfere with each other, assuring a relatively large number of parking spaces. In order that the positions of the saddles 25 of a plurality of parked two wheeled electric vehicles are set along a single straight line as shown by FIG. 11, the position determining mechanism 142 is constructed from a first position determining frame 150 in which the front wheel 148 (e.g. 24 inch) of a large sized two wheel electric vehicle 14A abuts therewith (FIG. 12), and a second position determining frame 156 in which the hub 154 of the front wheel 152 (e.g. 20 inch) of a small sized two wheel electric vehicle 14B abuts therewith (FIG. 13). Further, in a space within a lower guide rail 140 of the positioning determining mechanism 142, a vehicle sensor 158 is disposed for detecting the presence or absence of the two wheeled electric vehicle 14 (14A, 14B), as a detection of presence or absence of the front wheel. The vehicle sensor 158 is connected to the rental return control device 34.

Figure 14:
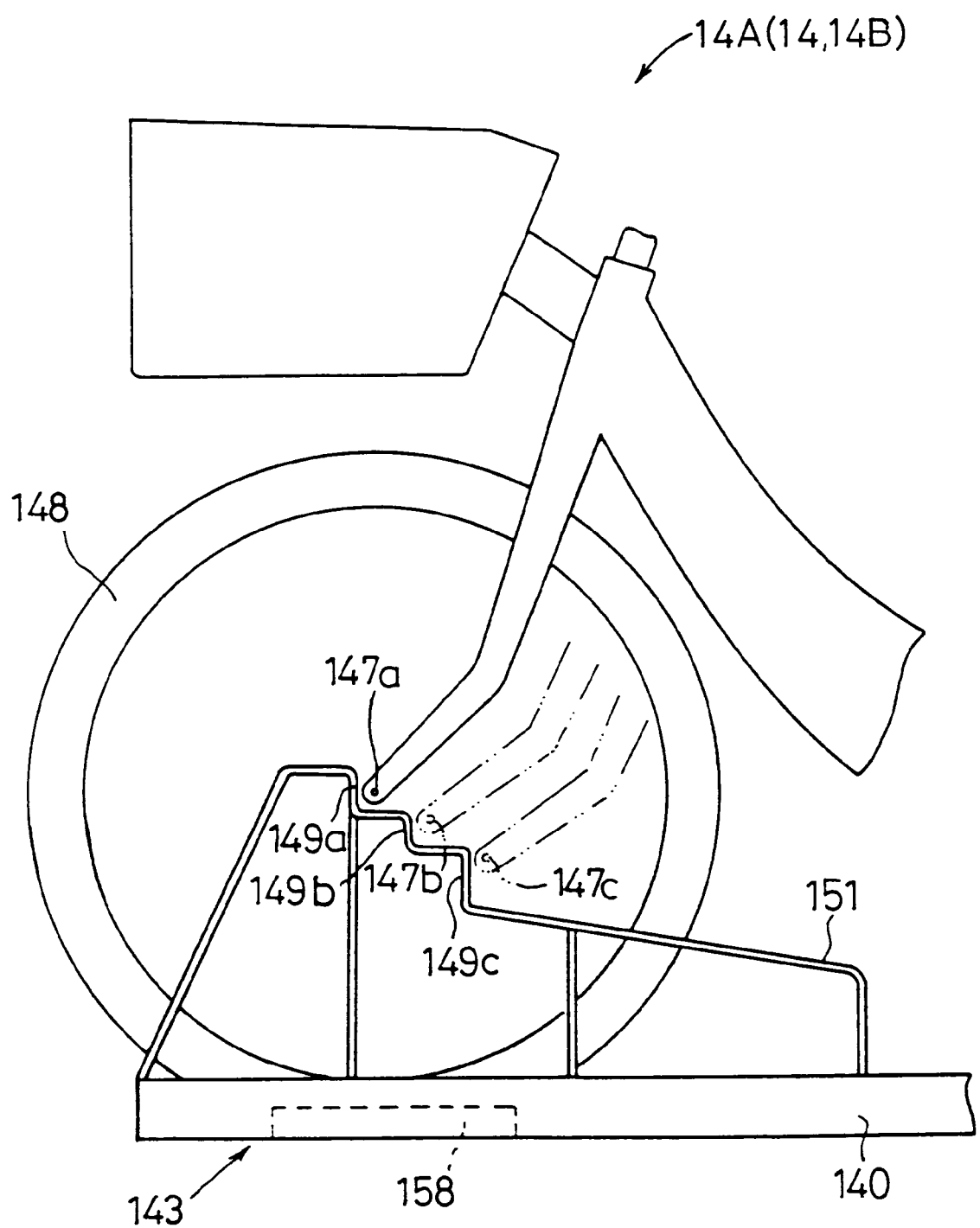
FIG. 14 is another structural explanatory view of the position determining mechanism.

Further, in place of the position determining mechanism 142 shown in FIGS. 12 and 13, the position determining mechanism 143 shown in FIG. 14 may also be used. More specifically, this position determining mechanism 143 has a position determining frame 151 formed by plural steps 149a–149c corresponding to hubs 147a–147c which differ in height and/or in their before and behind positions, adjusting to the size of the two wheeled electric vehicle 14.

Figure 15:
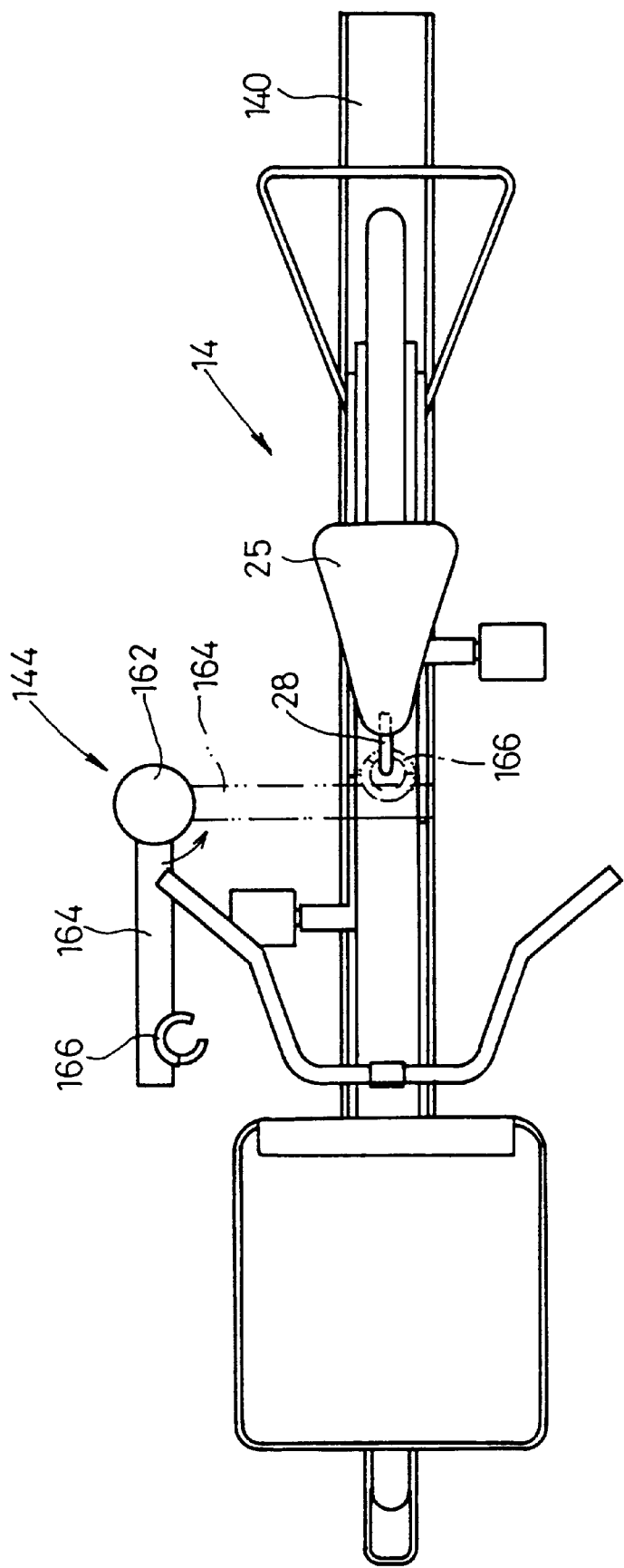
FIG. 15 is a view explaining the relation between a lock mechanism and a two wheeled electric vehicle.

The lock mechanism, as shown in FIGS. 3 and 15, is constructed from a support pillar 160 erected beside the guide rail 140, a pivot axis 162 disposed on an upper end of the support pillar 160, a pivot arm 164 having one end affixed to the pivot axis 162, and a circle lock 166 attached to the other end of the pivot arm 164. The circle lock 166, as shown in FIG. 15, by engaging a C-channel coupling member 28 on a main frame 26 of the two wheeled electric vehicle, prevents theft of the two wheeled electric vehicle, together with preventing toppling of the vehicle while it is parked. Further, when the main frame 26 is formed as a thin pipe, the circle lock 166 may also be directly coupled to the main frame 26.

Further, if the height of the support pillar 160 making up the lock mechanism 144 is constructed so as be optionally variable, a wide range of types of two wheeled electric vehicles 14 can be accommodated thereby.

Figure 16:
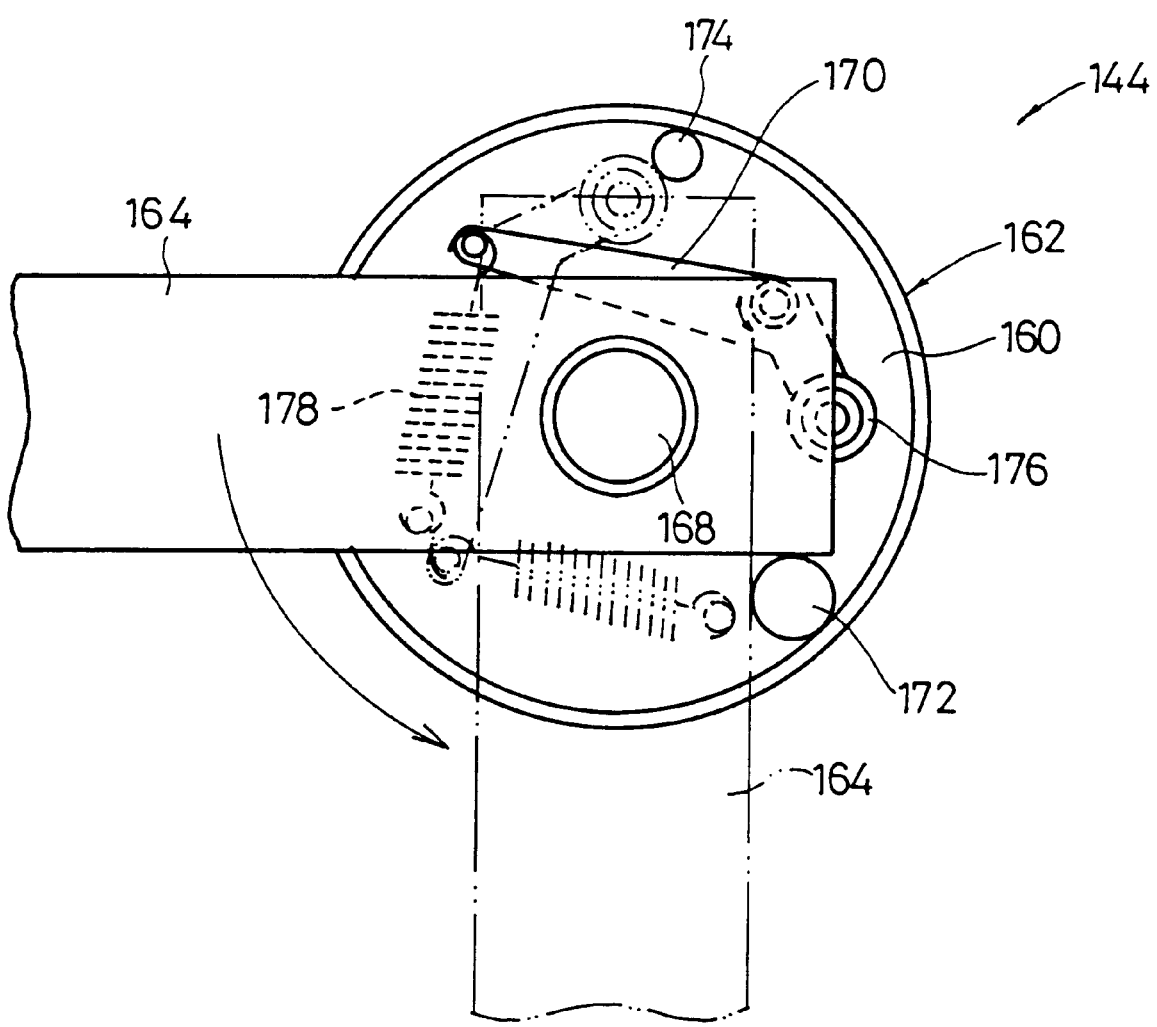
FIG. 16 is a structural view of a rotating member making up the lock mechanism.

The pivot 162, as shown in FIG. 16, comprises a pivot axis 168 for pivotally connecting the pivot arm 164 to the support pillar 160, a swing arm 170 having a central part thereof axially supported on the pivot arm 164, a stop pin 172 embedded in the support pillar 160 for controlling the pivoting range of the pivot arm 164, and a holding pin 174 also embedded in the support pillar 160 for keeping the pivot arm 164 in the condition shown by the phantom lines in FIG. 16. Further, a roller 176 which abuts with the holding pin 174 upon pivoting of the pivot arm 164 is disposed on one end of the swing arm 170. The space between the other end of the swing arm 170 and the pivot arm 164 is connected by a spring 178.

The vehicle rental system according to the present embodiment is constructed basically as described above. Next, an explanation shall be given concerning rental and return processing of two wheeled electric vehicles 14 used in the rental system.

When preceding to use the rental system, first, under control of the user management device 54, using the user certificate issuing device 56 in the control room 12, information such as the contract user's address, name, rental car type (or range of types), bank account number for settlement of use fees, card ID number, user ID number, security number, and a valid period of use, and so forth, are registered, and a user certificate such as a non-contact type IC card is issued. Further, user information is registered in the "user list" of the user management device 54.

Next, the user, now in possession of the user certificate, for example by the user telephone, calls to the stock availability response device 48 of the parking area 10. In this case, the parking apparatus 44 of the parking area 10 normally supplies a signal, relating to data of whether a two wheeled electric vehicle detected by a vehicle sensor 158 (see FIGS. 12–14) is available or not, to the rental return control device 34, and the rental return control device 34 converts such availability data to a voice signal indicating, for example, the type and number in stock of two wheeled electric vehicles, and supplies the same in real time to the stock response availability device 48. Thus, the user, following the voice response from the stock availability response device 48, can determine the availability of a desired two wheeled electric vehicle 14. Further availability of stock can also be directly confirmed by an image of the interior of the parking area supplied, for example, by a cable television.

Figure 17:
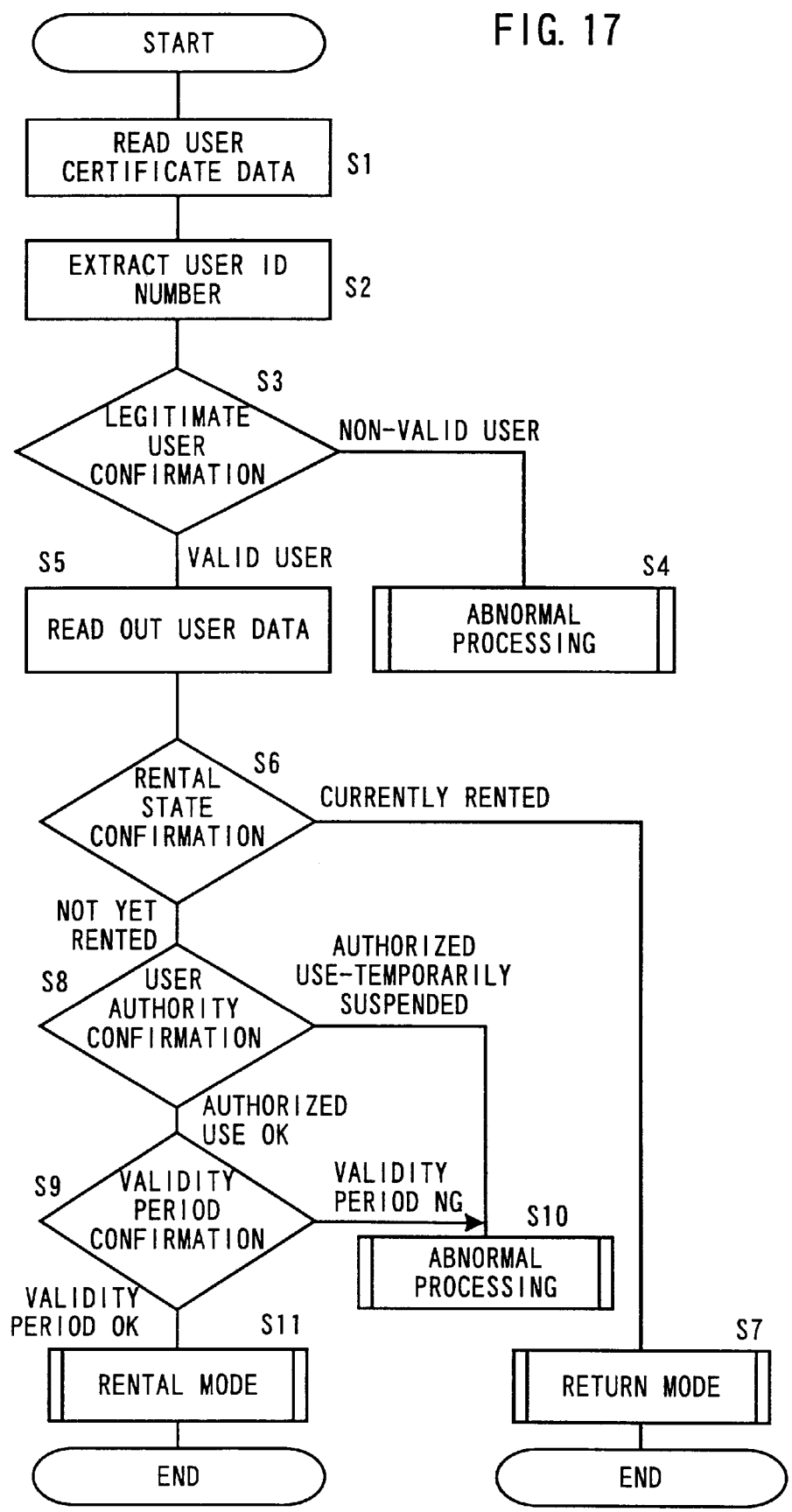
FIG. 17 is a flow chart for performing confirmation processing of a user.

Once availability of stock has been confirmed, next, the user proceeds to rent out a desired two wheeled electric vehicle at the parking area 10. In this case, first, user confirmation is performed by a user discrimination device 36. User confirmation processing is performed in accordance with the flow chart shown in FIG. 17.

More specifically, the user brings his user certificate, such as a non-contact type IC card, into proximity to the user discrimination device 36 disposed at the parking area 10. The rental return control device 34 then reads in user data, such as the card ID number and user ID number, via the user discrimination apparatus (Step S1), and from such user data, a user ID number is extracted (Step S2). The extracted user ID number, is transmitted to the user management device 54 over a modem 60, and by means of comparison with a registered user ID number, confirmation is performed as to whether the user is a valid legitimate user or not (Step S3). At this point, in the case of an invalid user, abnormal processing is effected (Step S4).

One the other hand, when a valid user is confirmed, user data such as a security number pertaining to the user ID number, type of rental vehicles (range), validity period, and rental conditions, are read out from the user management device 54, and are transmitted to the rental return control device 34 over the modem 60 (Step S5). In addition, based on the data of rental conditions, it is confirmed whether the user is currently renting a two wheeled electric vehicle 14 or not (Step S6). In this case, if a vehicle is currently being rented out, it is judged that the user intends to return the two wheeled electric vehicle 14, and "return mode" processing (to be described later) is effected (Step S7).

When it is confirmed that a vehicle has not yet been rented, based on the user data, confirmation of user authority, indicating whether or not the user can currently use the system or not, is performed (Step S8). If such authority is confirmed, next, it is determined whether the user certificate of the user is within a validity period (i.e. non-expired) (Step S9). Further, if the user is not authorized, or if the validity period has expired, abnormal processing is effected (Step S10). If the user possesses proper authority, and the validity period has not expired, a subsequent "rental mode" is effected (Step S11).

Figure 18:
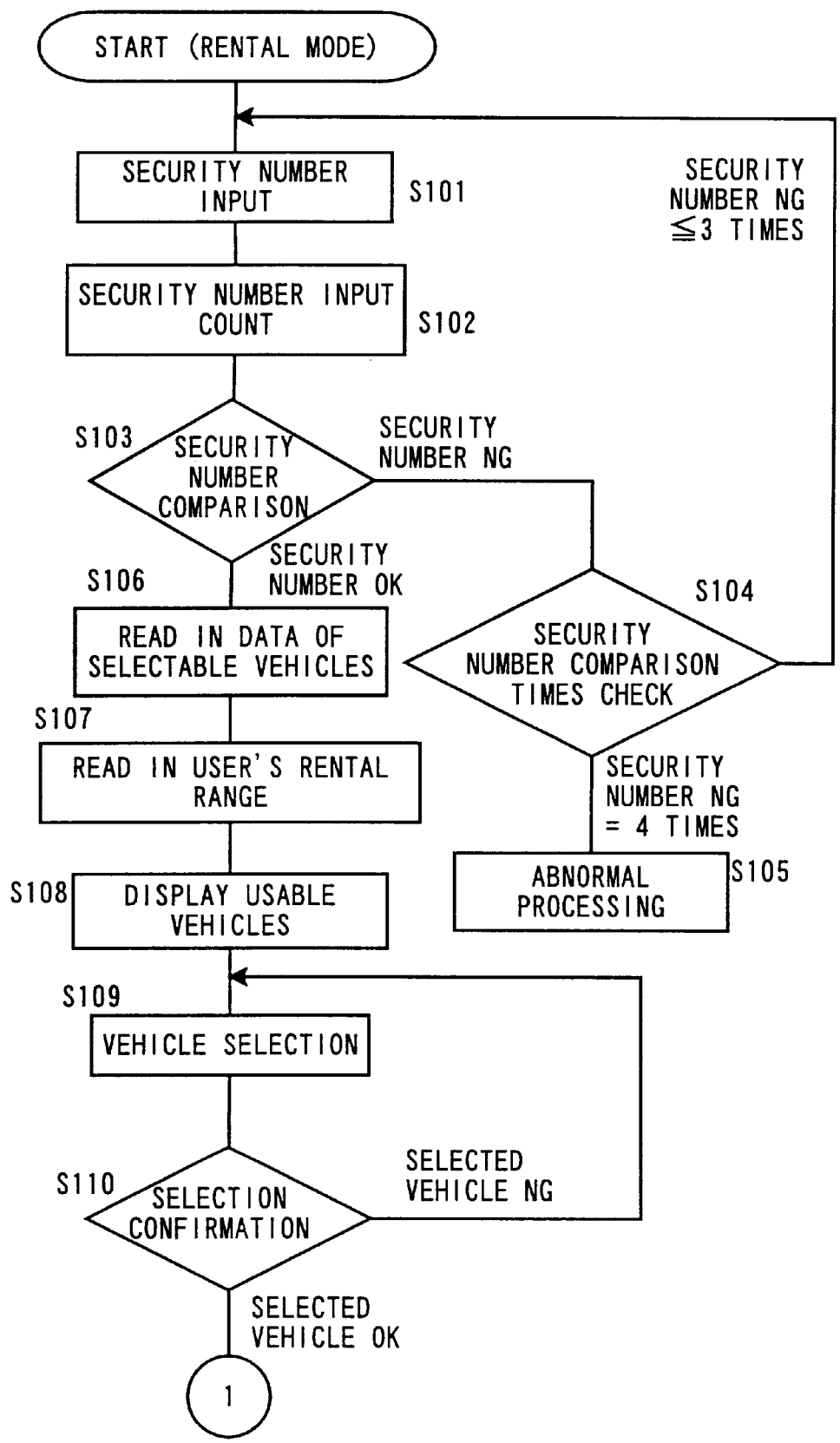
FIG. 18 is a flow chart of a loaning mode.
Figure 19:
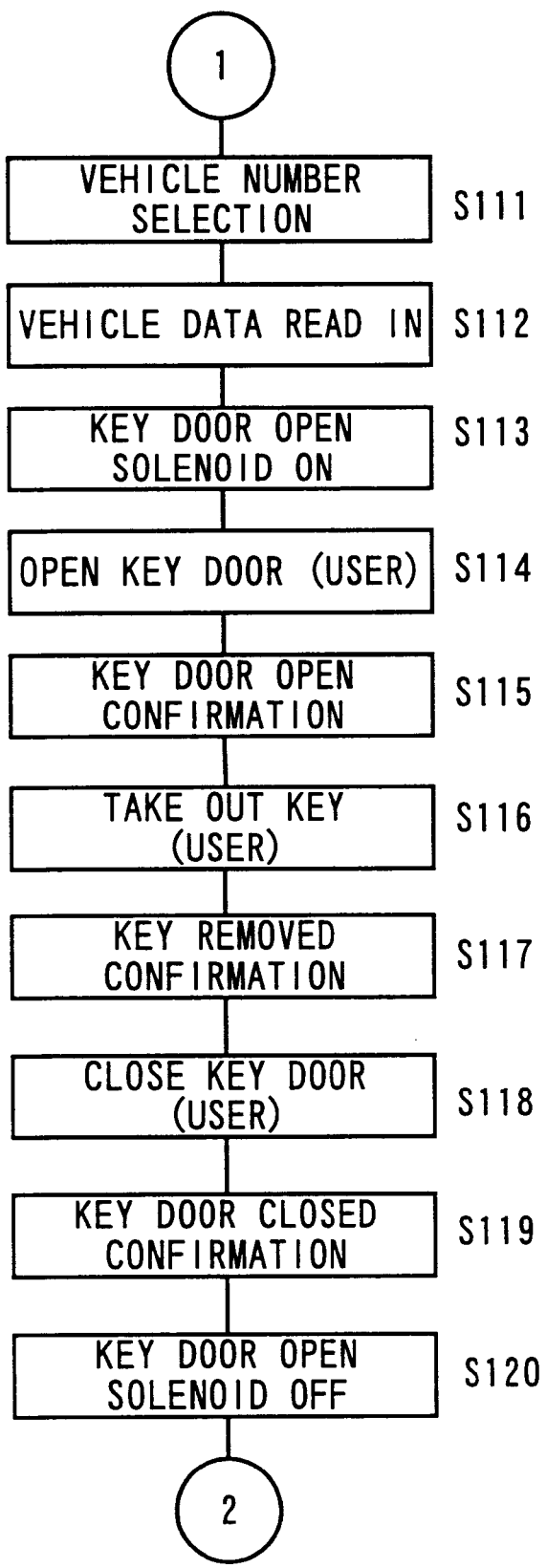
FIG. 19 is a flow chart of a loaning mode.
Figure 20:
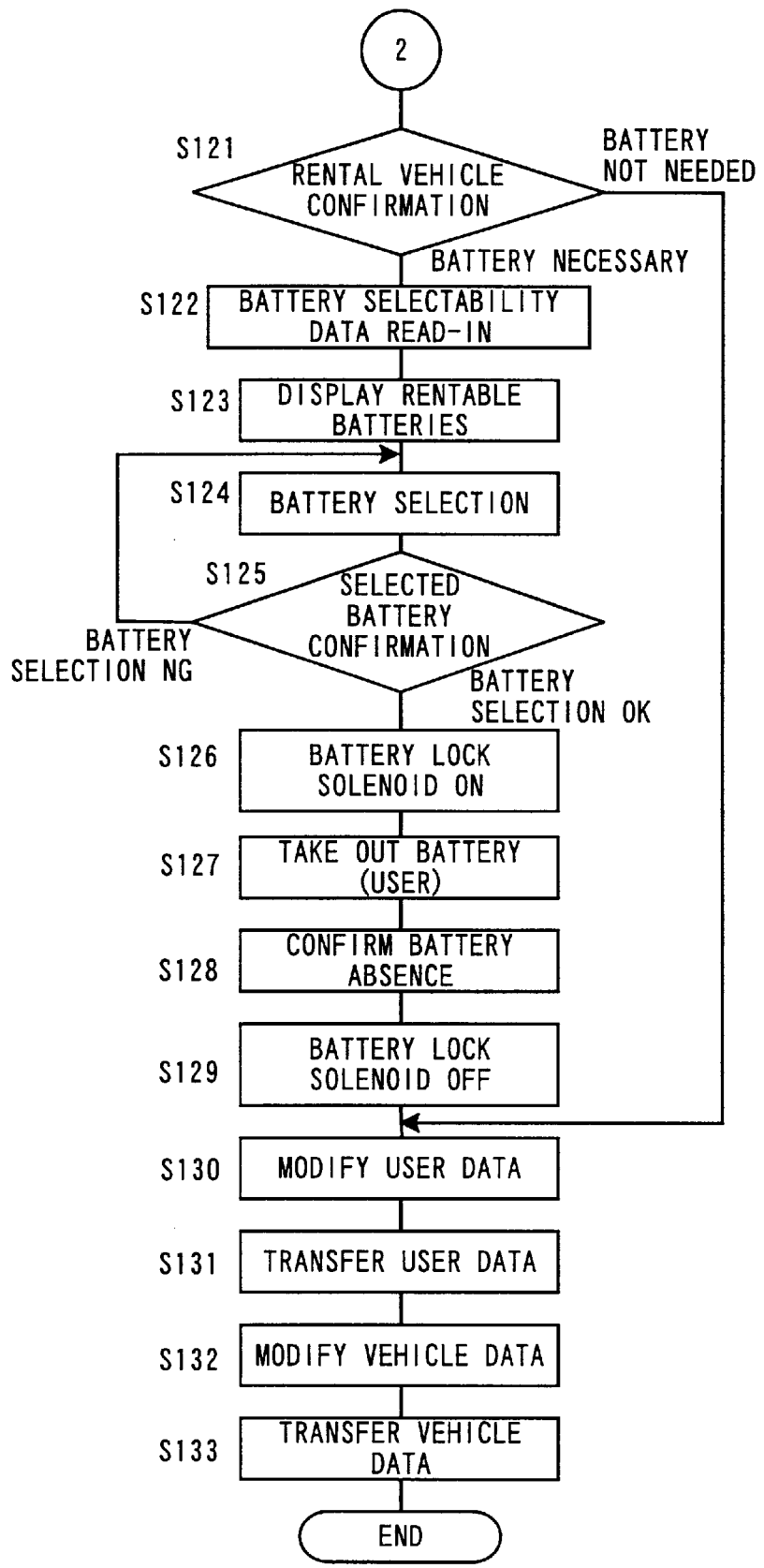
FIG. 20 is a flow chart of a loaning mode.
Figure 22:
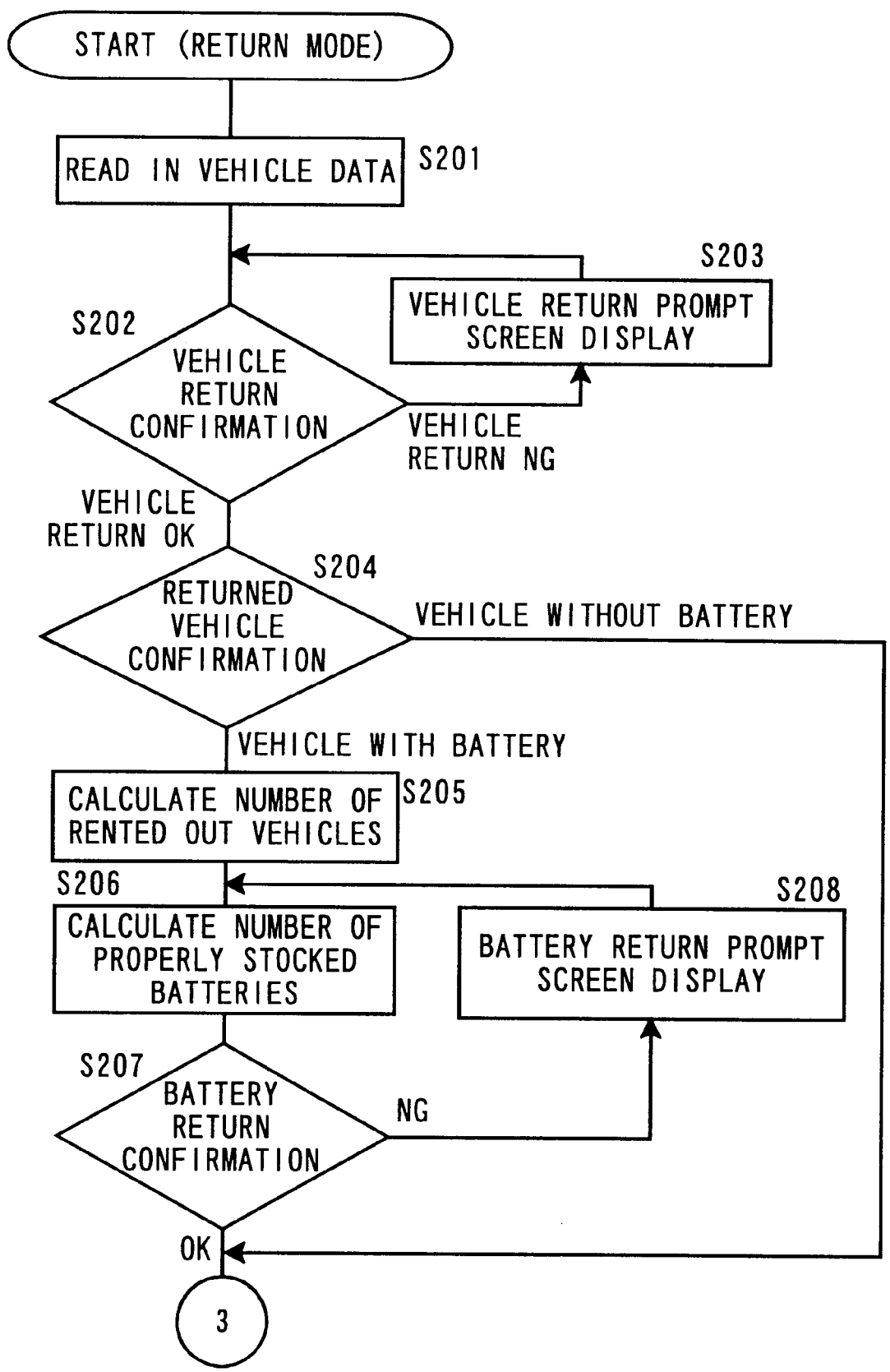
FIG. 22 is a flow chart of a return mode.
Figure 23:
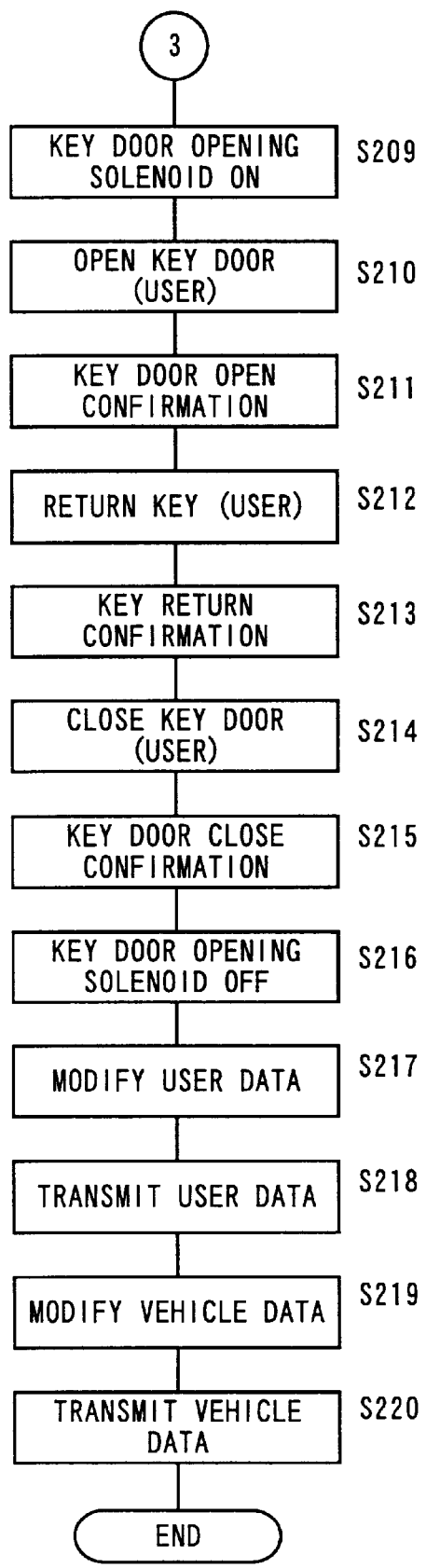
FIG. 23 is a flow chart of a return mode.

Accordingly, following the flow charts of FIGS. 18 through 20, "rental mode" processing shall now be explained.

First, the user enters a security number using the touch panel display device 38 (Step S101). The rental return control device 34 initiates counting of the number of times that the security number is input (Step S102), together with comparing the input security number with a security number in the registered user data (Step S103). At this point, if the number of input times for the security number is greater than 3, the security number is regarded as incorrect and abnormal processing is effected (Step S105).

On the other hand, in case of agreement of the security number, vehicle selectability data based on data from the parking apparatus 44 is read in (Step S106) along with reading in the rental vehicle types (or range of types) from the user data (Step S107). More specifically, the parking apparatus 44 supplies data on availability of electric two wheeled vehicles (i.e. whether a given vehicle is present or not) as a signal from the vehicle sensor 158 (see FIGS. 11 and 12) to the rental return control device 34. In this case, the rental return control device 34, based on such availability data, generates data indicating whether the two wheeled electric vehicle 14 is currently being used, whether use thereof is possible within the range of rental vehicles for the given user, or whether the vehicle is unusable due to damage or the like. In addition, based on such data, usable vehicles are then displayed on the touch panel display device 38 (Step S108).

On the touch panel display device 38, usable two wheeled electric vehicles 14 at the parking area 10 are displayed by means of pictures (photos) or the like, in order to enable understanding of color, size, saddle height, etc. In addition, information on the usage fee and usage times are also displayed. Based on such a display, the user selects a desired two wheeled electric vehicle 14 by manipulating the touch panel display device 38 (Step S109). The rental return control device 34 confirms whether the two wheeled electric vehicle selected by the user is usable or not (Step S110).

If the two wheeled electric vehicle 14 selected by the user can be used, the rental return control device 34 selects the vehicle number (Step Sill) and reads in vehicle data corresponding to the vehicle number (Step S112).

Next, the rental return control device 34, in accordance with the vehicle number, outputs an unlocking signal to the key box 64 (see FIG. 4) which holds the key for the selected two wheeled electric vehicle 14. A solenoid 78 in the key box 64, in accordance with the unlocking signal, causes the rod 80 to be retracted from the coupling member 82 on the key door 68 (Step S113). As a result, only the key box 64 which holds the key corresponding to the two wheeled electric vehicle selected by the user is unlocked. At this time, the light emitting element 88 disposed on top of the key box 64 flashes, alerting the user that it is unlocked. However, the indication that the key box 64 holds a usable key, in place of being performed by a light emitting element 88, can likewise be performed by an audible signal or the like.

When the user opens the key door 68 of the key box 64 having the flashing light emitting element (Step S114), the sensor 74 is operated and the light emitting element 86 flashes, indicating that the key door 68 has been opened. The user rotates the key cylinder 76 to the "rented out" side, and pulls out the key (Step S116), at which point the light emitting element 86 assumes an illuminated state, together with informing the rental return control device 34 that the key has been removed (Step S117). In this case, it is confirmed by the rental return control device 34 that rental of the two wheeled electric vehicle 14 with a vehicle number corresponding to the concerned key has been initiated.

Once the user closes the key door 68 of the key box 64 (Step S118), the sensor 74 is operated and the light emitting elements 86, 88 are extinguished, together with informing the rental return control device 34 that the key door 68 has been closed (Step S119). Thus, the rental return control device 34 outputs a locking signal to the solenoid 78, wherein the rod 80 is lowered by the unlocking signal into engagement with the coupling member 82, and locking is performed (Step S120).

Next, the rental return control device 34 confirms the vehicle type of the rented two wheeled electric vehicle 14 from the vehicle number (Step S121). In this case, it is confirmed whether or not the selected two wheeled electric vehicle 14 requires a detachable battery 18, and if necessary, battery selectability data is read in (Step S122). Further, in the case of a two wheeled electric vehicle which does not use a detachable battery, the vehicle is directly charged via an outlet at the parking area 10, as shown in FIG. 3, and hence there is no need to select a battery. Herein, the battery selectability data includes battery availability data at the respective receptacles 100 of the battery supply device 42, and data pertaining to selectable batteries which is created by usability data based on charge condition. Further, battery availability can be confirmed by the sensor 106, shown in FIG. 6, whereas the charge condition can be confirmed by the charging circuit 102.

The touch panel display device 38 displays rentable batteries, as shown in FIG. 21, based on the battery selectability data which was read-in (Step S123). More specifically, on the touch panel display device 38, in order to facilitate selection by the user, for example, fully charged rentable batteries 18, rented-out batteries 18, or non-fully charged batteries 18, are displayed in a state so that they can be distinguished from each other, for example using different colors. For example, by displaying uncharged states in red, half-charged states in yellow, three-fourths charged states in blue, and fully charged states in green, in the event that fully charged batteries are temporarily unavailable, batteries other than fully charged ones can still be rented and used for short distances.

Then the user, after selecting a desired usable battery number from among the displayed batteries 18, selects a determined key (Step S124). In this case, the rental return control device 34 confirms whether or not the selected battery 18 is charged to a usable condition (Step S125), and if usable, the lock mechanism 108 of the corresponding receptacle 100 of the battery supply device 42 is unlocked (Step S126) together with illuminating the light emitting element 110.

Herein, the battery supply device 42 is equipped with receptacles 100 capable of charging and maintaining a plurality of batteries which are greater in number than the number of rentable two wheeled electric vehicles at the parking area. Accordingly, if a user, for example from a condition in which all other two wheeled electric vehicles have been rented out, attempts to rent a two wheeled electric vehicle immediately after the return thereof, it is possible to quickly rent out an unused sufficiently charged battery 18 from the battery supply device 42. In this case, the user is not made to wait a long time in order for the battery 18 to be charged, permitting extremely efficient rental of two wheeled electric vehicles 14. Further, the number of batteries 18 can be set at under double that of the number of rentable two wheeled electric vehicles 14, however, it is also acceptable to simulate use conditions for setting an optimal number.

The batteries 18 accommodated in the receptacles 100, as shown in FIG. 6, are locked by engagement of an engagement surface 92 of the projection 96 disposed on one side of the battery 18, with an engagement surface 126 of the claw member 114 making up the lock mechanism 108. Further, when in this condition, unillustrated electrodes on the bottom of the battery 18 contact electrodes 104 of the charging circuit 102, whereby charging is continually performed. In addition, the charge condition is detectable from the outside by means of light emitting elements 112.

Figure 7:
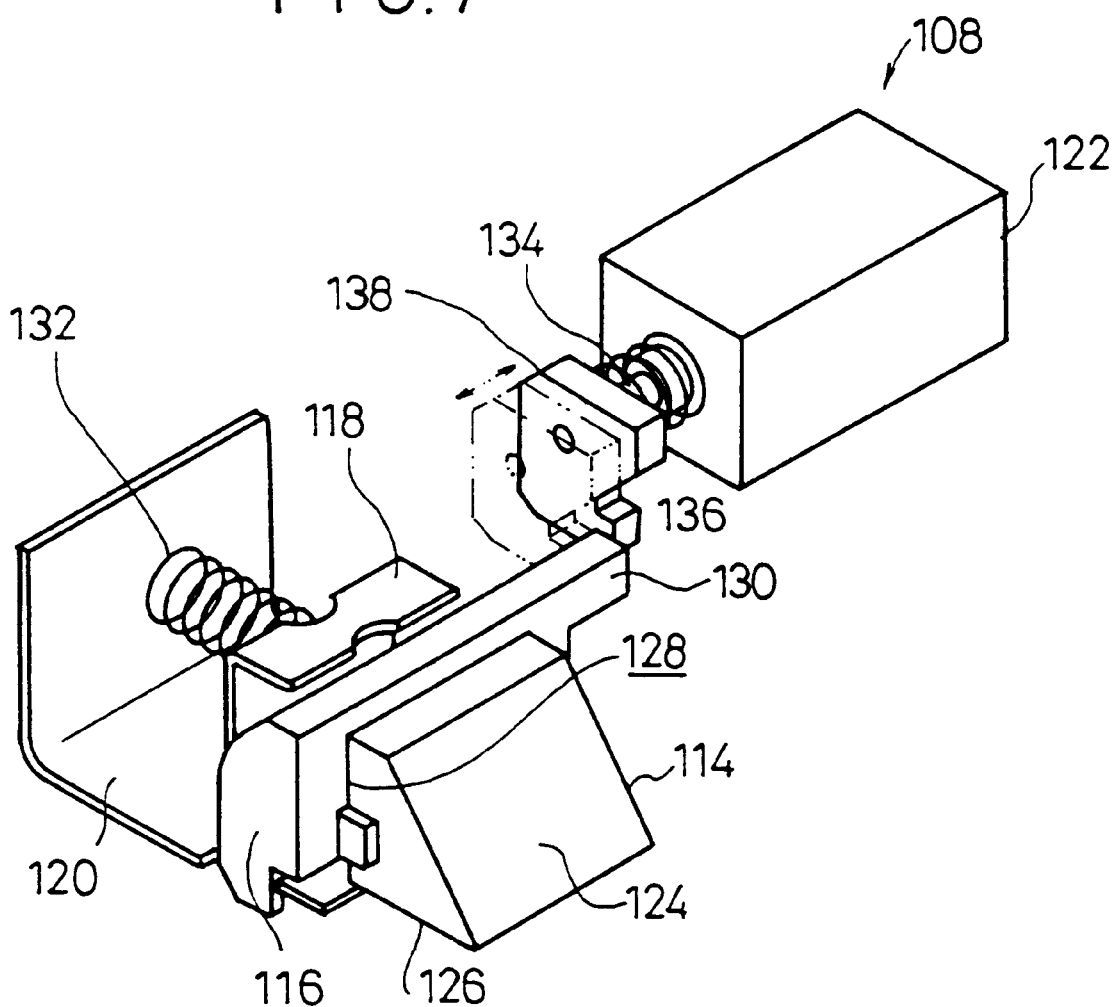
FIG. 7 is a structural view of a locking mechanism in the battery supply device.
Figure 8:
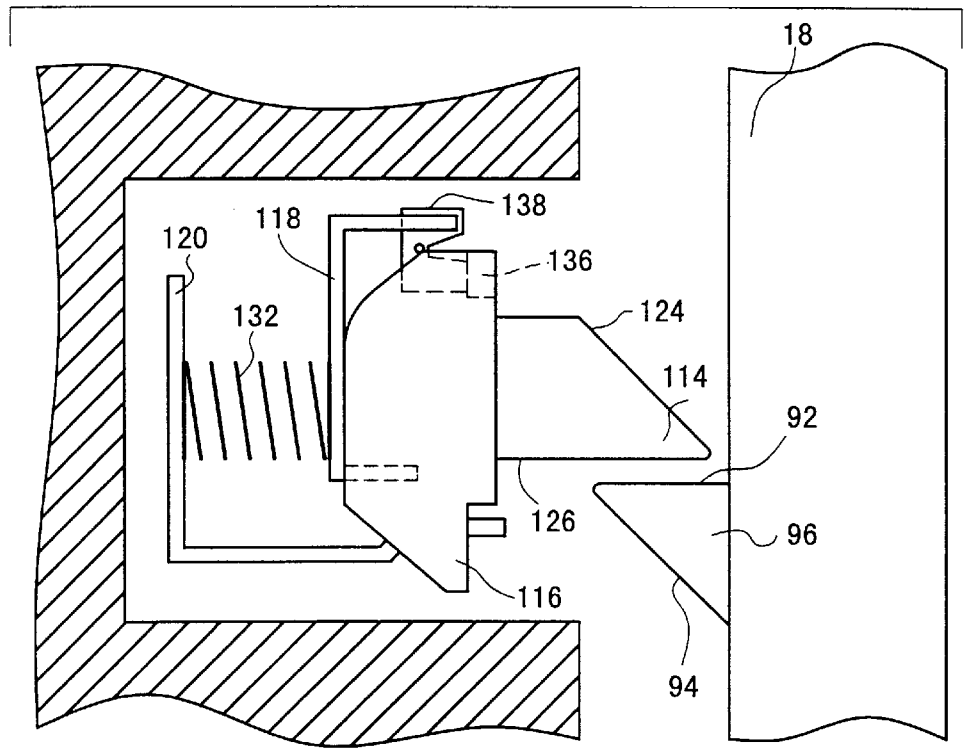
FIG. 8 is a cross-sectional explanatory view showing a locked state of the locking mechanism in the battery supply device.
Figure 9:
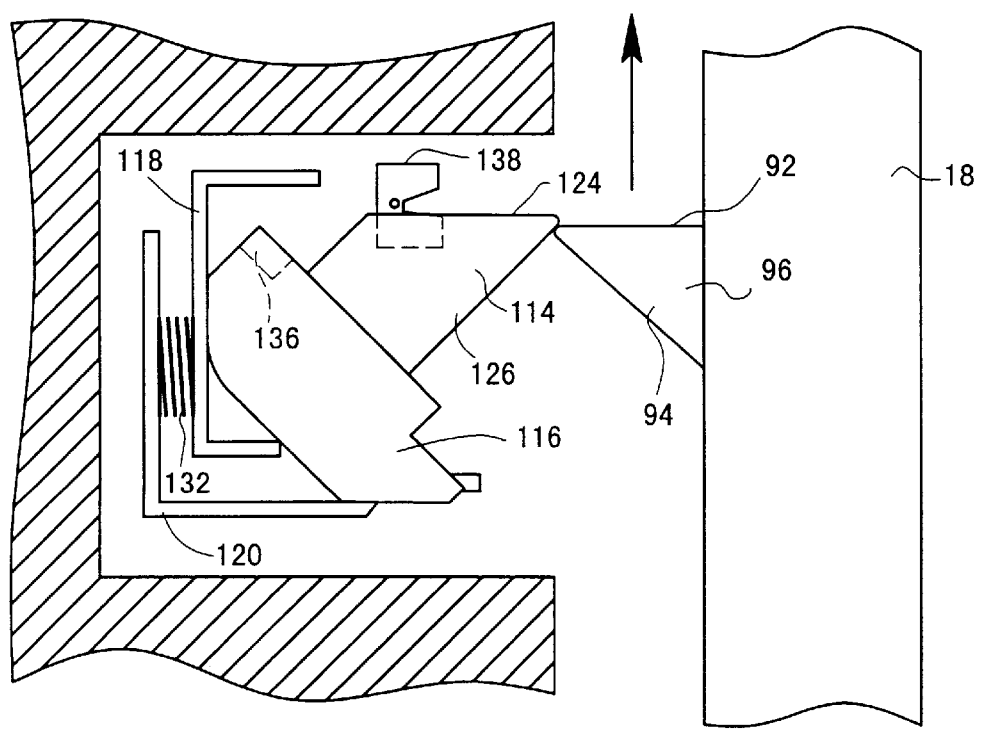
FIG. 9 is a cross-sectional explanatory view showing an unlocked state of the locking mechanism in the battery supply device.

Then, when an unlocking signal is supplied to a specified receptacle 100 from the rental return control device 34, as shown in FIG. 7, the solenoid 122 is operated, the rod 134 is retracted and the stopper 138 becomes separated from the stop member 130 of the holder 116 (Step S126). In this condition, when the operator pulls out a battery 18 from the receptacle 100, the holder 116 inclines as shown in FIG. 9 through the claw member 114 of the lock mechanism 108, and by means of the projection 96 on the battery 18. Accordingly, the projection 96 overcomes the claw member 114 so that the battery 18 can be pulled out (Step S127).

When the battery 18 is withdrawn, the sensor 106 disposed on the bottom of the receptacle 110 detects the absence of the battery 18, and a detection signal thereof is transmitted to the rental return control device 34 (Step S128). In succession, the solenoid 122 of the lock mechanism 108 is operated, and through the rod 134, the stopper 138 engages the stop member 130 of the holder 116, and the lock mechanism 108 once again becomes in a locked state, and moreover, the light emitting element 110 is extinguished (Step S129).

On the other hand, after completion of the above processing, the rental return control device 34 writes in a flag, or the like, with respect to user data maintained in a register, indicating the vehicle number of the rented twowheeled electric vehicle, a rental time schedule, and the fact that the vehicle is currently rented out (Step S130), transmitting the same to the user management device 54 over the modem 60 (Step S131). Further, the user ID number of the user of the concerned two wheeled electric vehicle, the rental start time, and so forth, are written in with respect to vehicle data maintained in a register (Step S132), and transmitted to the user management device 54 over the modem 60 (Step S133).

After completing the rental processing as described above, the user utilizes the key which was taken out from the key supply device 40 and unlocks a given two wheeled electric vehicle 14 from the parking apparatus 44. In this case, the two wheeled electric vehicle 14, as shown in FIGS. 3 and 15, is locked in the parking apparatus 44 by the circle lock 116 disposed on an end of the pivot arm 164 making up the locking mechanism 144, which is arranged between adjacent two wheeled electric vehicles 14.

Then, the circle lock 166 is opened using the key and is taken out from the C-channel coupling member 28 of the main frame 26. In this case, as shown in FIG. 11, because the guide rails 140 are arranged to be slanted, no obstruction results with respect to the adjacent two wheeled electric vehicles 14 when unlocking the lock mechanism 144. The pivot arm 164 which is unlocked from the circle lock 166, as shown by FIG. 16, is pivoted about the pivot axis 168 of the support pillar 160, retreating to the position shown by the actual lines. Further, when the pivot arm 164 is pivoted, accompanying the pivoting operation, a roller 176 arranged on an end of the swing arm 170 and which is axially attached to the pivot arm 164 surpasses the support pin 174 of the support pillar 160, while opposing the elastic force of the spring 178. At this time, the end of the pivot arm 164 abuts with the stop pin 172 and is halted.

After unlocking in the manner described above, the two wheeled electric vehicle 14 is taken out from the parking apparatus 44.

At this point, as shown in FIG. 3, the front and rear wheels of the two wheeled electric vehicle 14 are supported on the guide rail 140, and moreover, as shown by FIGS. 12 and 13, the front wheel 148 is still fixed in position by the position determining mechanism 142. In this case, for a two wheeled electric vehicle 14A having a large sized front wheel 148

(see FIG. 12), the front wheel 48 is in a condition of abutment with the first position determining frame 150. In contrast thereto, for a two wheeled electric vehicle 14B having a small sized front wheel 152, the hub 154 of the wheel 152 thereof is in a condition of abutment with the second position determining frame 156. Accordingly, as shown in FIG. 11, by adjustment of the position of the second position determining frame 156, independent of the size of the two wheeled electric vehicles 14A, 14B, the position of the saddle 25 with respect to the wall of the parking area 10, can be set the same (refer to the dotted line).

In this manner, because the position of adjacent saddles 25 are set at the same position, even in the case that differently sized two wheeled electric vehicles 14 are parked adjacently, a situation in which the handlebars 19 interfere, resulting in inconvenience with respect to insertion and removal of two wheeled electric vehicles 14, can be avoided.

Further, each of the two wheeled electric vehicles 14 is parked in a condition in which it is not inclined, or leaning over, due to being locked at the main frame 26. As a result, the user is not obstructed by adjacent two wheeled electric vehicles 14, and can easily enter in between such vehicles for performing the unlocking operation.

Further, as shown in FIG. 14, a position determining frame 151 may be provided having a plurality of steps 149a–149c thereon whose height and position are set in correspondence with the size of the two wheeled electric vehicles 14, wherein by regulating the position of the hub 147a–147c by the steps 149a–149c, the position of the saddles 25 can also be set the same.

The user, after accommodating the battery 18 which has been pulled out from the battery supply device 42 in the battery case 20 of the two wheeled electric vehicle 14 removed as described above, and closing the lid 24, locks the lock mechanism 22 using the same key used to unlock the circle lock 166. The user then mounts the two wheeled electric vehicle 14 having the battery 18 installed as described, and moves the vehicle to a desired location.

Next, processing upon return of the used two wheeled electric vehicle 14 shall be explained. The user, at the parking area 10, similar to the case when the two wheeled electric vehicle 14 was rented out, first brings the user certificate into proximity with the user discrimination device 36. The rental return control device 34 reads in the user data, via the user discrimination device 36, and by comparison of the user ID extracted from the user data with a registered user ID, it is confirmed whether or not the user in question is a legitimate user. When a legitimate user is confirmed, user data including the security number pertaining to the user ID, rental vehicle types (range), validity period, rental conditions, and so forth, are read out from the user management device 54, and based on the data of rental conditions, it is confirmed whether or not the user is currently renting out the two wheeled electric vehicle 14. In this case, because the vehicle is currently being rented out, it is judged that the user now intends to return the two wheeled electric vehicle 14, and "return mode" processing is effected.

Next, such "return mode" processing shall be explained following the flow charts shown in FIGS. 19 and 20.

First, the rental return control device 34 reads in data including the vehicle number, user ID number, rental initiation time, rental return time, and the like (Step S201), and performs confirmation as to whether the two wheeled electric vehicle 14 relating to the vehicle number has been returned or not (Step S202). The touch panel display device 38, in the case that the two wheeled electric vehicle 14 has not been returned, displays a vehicle return prompt screen, prompting the user to return the vehicle (Step S203).

Then, the user returns the two wheeled electric vehicle 14 to a prescribed position in the parking apparatus 44. More specifically, the front wheel is engaged with respect to the guide rail 140, and next, after abutment of the front wheel of a two wheeled electric vehicle 14A against the first position determining frame 150, or abutment of the hub 154 of a two wheeled electric vehicle 14B against the second position determining frame 156, the circle lock 166 making up the lock mechanism 144 is locked into the C-channel coupling member 28 on the main frame 26. Further, when locked, the pivot arm is pivoted roughly 90° from the condition shown in FIG. 15, and because the roller 176 is fixed by being in a state of having surpassed the holding pin 174, the pivot arm 164 is maintained in a state shown by the phantom lines. Accordingly, the locking operation by the user is made easy.

When the two wheeled electric vehicle 14 is returned to a prescribed parking apparatus 44 as described above, the sensor 158 disposed in the positioning determining device 142 detects the returned condition, and transmits a return detection signal to the rental return control device 34. As a result, the rental return control device 34 judges that the prescribed two wheeled electric vehicle 14 is now returned (Step S202), and performs confirmation of the type of returned vehicle based on the stock data (Step S204).

At this point, in the event that the returned vehicle is a two wheeled electric vehicle 14 which has a detachable battery 18, the number of currently rented out vehicles is calculated (Step S205), whereas, based on the number of batteries currently rented out as detected by the sensor 106 in the battery supply device 42, and the number of currently rented out vehicles, the proper number of batteries 18 to be kept in stock is calculated (Step S206). It is then confirmed whether on not the battery 18 has been returned or not (Step S207). In the case that the battery 18 has not been returned, the touch panel display device 38 displays a battery return prompt screen, prompting the user to return the battery (Step S208).

Figure 10:
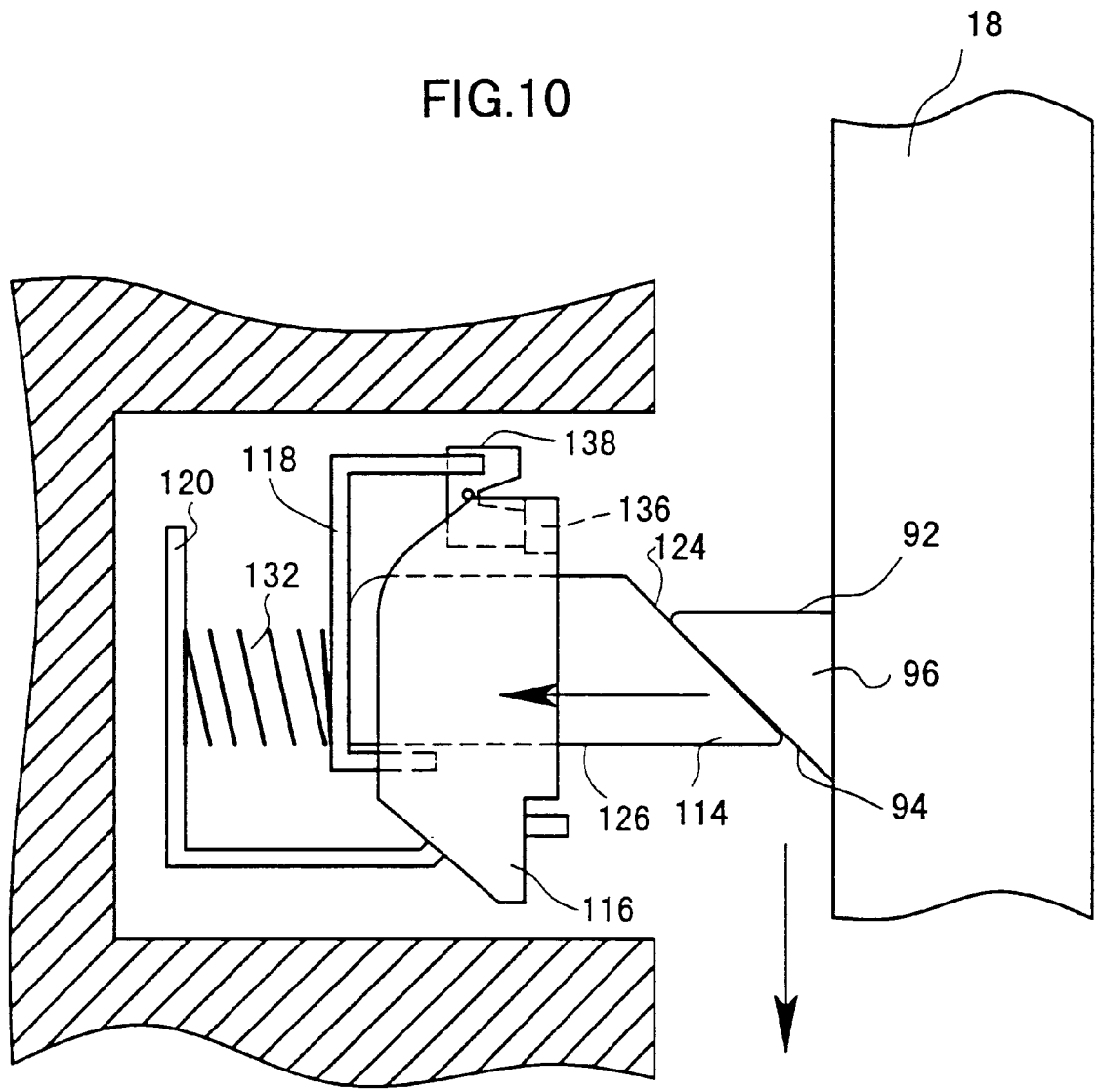
FIG. 10. is a cross-sectional explanatory view showing a state when a battery is inserted into the battery supply apparatus.

Then, the user takes out the battery 18 from the battery case 20, and places the battery into a receptacle 100 of the battery supply device 42. At this point, when the battery 18 is inserted, the inclined surface 94 of the projection 96 thereof, press the inclined surface 24 of the claw member 114 of the lock mechanism 108. In this case, as shown in FIG. 10, the claw member 114 is displaced with respect to the holder 116 in the direction of the arrow. In addition, when placement therein of the battery has been completed, the claw member 114 returns to the condition of FIG. 8 by the elastic force of spring 132. Further, return of the battery 18 is detected by the rental return control device 34.

After return of both the two wheeled electric vehicle 14 and the battery 18, the user returns the key. In this case, the rental return control device 34, in accordance with the vehicle number of the returned two wheel electric vehicle 14, outputs an unlocking signal to the corresponding key box 64 (see FIG. 4). The solenoid 78 of the key box 64 retracts the rod 80 from the coupling member 82 of the key door in accordance with the unlocking signal (Step S209). Based thereon, the key box 64 is unlocked. At this time, the light emitting element 88 on top of the key box 64 flashes, informing the user that the key box is unlocked.

When the user opens the key door 68 of the key box with the flashing light emitting element 88 (Step S210), the sensor 74 is operated and the light emitting element 86 flashes, signaling that the key door 68 is open (Step S211).

The user inserts the key into the key cylinder 76 and rotates it to the "returned" side (Step S212), whereby the light emitting element 86 assumes an illuminated state, together with informing the rental return control device 34 that the key has been returned (Step S213).

The rental return control device 34 compares the characteristic key data transmitted from the specified key cylinder 76 with the characteristic key data which is managed as user data of the user management device 54, and confirms that the concerned key is the specific key which was rented out.

Further, when the key which has been inserted into the key cylinder 76 by the user is different from the key which was rented out, the cylinder 76 cannot be turned to the "returned" side, and therefore it can be determined that it is not a legitimate key.

When the user closes the key door 68 of the key box 64 (Step S214), the sensor 74 is operated and the light emitting elements 86, 88 are extinguished, together with informing the rental return control device 34 that the key door 68 has been closed (Step S215). Then, the rental return control device 34 supplies a locking signal to the solenoid 78, whereby in accordance with the locking signal, the rod 80 is lowered to engage the coupling member 82, and locking is performed (Step S216).

On the other hand, the rental return control device 34 performs a clearing process, with respect to user data maintained in a register, to clear a flag indicating the vehicle number of the returned two wheeled electric vehicle 14 and that the vehicle is rented out, along with writing in the rental termination time (Step S217), and transmitting such information to the user management device 54 over the modem 60 (Step S218). Further, with respect to the vehicle data maintained in the register, a clearing process is performed to clear a flag indicating the user ID number and that the vehicle is rented out, and to write in the rental termination time (Step S219), transmitting such information to the user management device 54 over the modem 60 (Step S220).

By performing the above steps, return processing of the two wheeled electric vehicle is completed. Further, the use conditions of the user who performed rental of the two wheeled electric vehicle 14 are managed by the user management device 54 based on the user data. For example, the user conditions of the contracted user, with respect to each credit interval, are totaled, and the information of amount due is displayed via the touch panel display device 38, together with issuing usage details, performing processing of the amount due, and so forth.

Further, in the above described embodiment, because the batteries 18 are of the same form, from among the plural receptacles 100 disposed in the battery supply device 42, the battery can be returned optionally to any open receptacle 100. However, in the case of plural different types of batteries 18, it can also be constructed to indicate receptacles to which the battery should be returned, corresponding to its battery type.

In this case, if receptacles 100 apart from those in which the battery can be returned are kept in a locked state, an inconvenience can be avoided in which a different type of battery is mistakenly placed into a receptacle to which it does not correspond.

What is claimed is:

1. A battery rental system wherein batteries are supplied for use in rental vehicles, comprising:

a battery supply device holding a plurality of batteries each accommodated in a locked state in a corresponding battery receptacle, for charging said batteries, and for unlocking and supplying a desired one of said batteries;

a user discriminating device for discerning users who shall use said batteries;

a selecting device for selecting from among usable batteries;

a rental return control device for controlling said battery supply device, said user discrimination device, and said selection device, and performing rental and return processing of said batteries;

a user management device for managing use condition of users who use said batteries;

a plurality of battery receptacles each of said receptacles including a locking mechanism for accommodating a single battery therein in said locked state; and means for unlocking said locking mechanism and releasing the battery from said locked state, for permitting a user to grasp and pull said batteries out of said receptacles.

2. The battery rental system according to claim 1, further comprising a user certification issuing device for issuing a user certificate to said users to use said batteries, wherein said user discriminating device discerns user information which is recorded on said user certificate.

3. The battery rental system according to claim 1, wherein said user discriminating device discerns user information which is recorded on an IC card.

4. The battery rental system according to claim 1, wherein said selection device further comprises a display means for displaying selection information relating to usable batteries, and a selection means for selecting a desired battery according to the selection information displayed on said display means.

5. The battery rental system according to claim 1, wherein said selection device further comprises a touch panel display device.

6. The battery rental system according to claim 1, wherein said electric vehicles comprise two wheeled electric vehicles.

7. The battery rental system according to claim 1, wherein said rental return control device controls said battery supply device for enabling rental of batteries in a usable charged state.

8. The battery rental system according to claim 1, wherein said battery supply device comprises a plurality of battery receptacles capable of holding a number of said batteries which is greater than the number of rentable electric vehicles, and a battery charging circuit disposed in each of said receptacles for charging the batteries accommodated therein.

9. The battery rental system according to claim 1, wherein said battery supply device further comprises a display means for displaying a charge state of said batteries.

10. A battery supply device wherein batteries are supplied for use in rental vehicles the battery supply device having a receptacle for accommodating therein a rentable battery, a charge circuit for charging the battery accommodated in said receptacle, and comprising a lock mechanism for locking the battery accommodated in said receptacle, said lock mechanism comprising:

a claw member for engaging said battery;

a holder for retractably supporting said claw member against the battery;

a resilient member for projecting said claw member toward a side of said battery, whereby said claw member engages a projection disposed on the side of said battery; and a stop means having a retractable stop member for maintaining the projected state of said claw member by engagement of said stop member with a portion of said holder, wherein when said battery is inserted into said receptacle, said claw member retracts while opposing the elastic force of said resilient member, and wherein when said battery is pulled out from said receptacle by a user, said holder is moved angularly by said projection, thereby inclining said claw member to permit removal of said battery.

11. The battery supply device according to claim 10, wherein said claw member includes an inclined surface, a battery insertion side of which is inclined in said receptacle, and an engagement surface, a battery pull-out side of which is engaged by said battery in said receptacle, wherein, when said battery is inserted into said receptacle, said claw member is retracted by said inclined surface in opposition to the elastic force of said resilient member.

12. A battery supply device wherein batteries are supplied for use in plural rental vehicles, comprising:

a plurality of receptacles, each receptacle accommodating a rentable battery therein in a locked state, each of said receptacles comprising:

a charging circuit for charging the battery accommodated in the receptacle;

a lock mechanism for locking the battery accommodated in the receptacle;

means for unlocking said lock mechanism and releasing said battery from said locked state, for permitting a user to grasp and pull said battery out of the receptacle;

a charge detection means for detecting a charge state of the battery accommodated in the receptacle; and an availability detecting means for detecting the presence or absence of the battery in the receptacle.

13. The battery supply device according to claim 12, further comprising a charge state display means for indicating a charge state of the battery accommodated in the receptacle.

14. The battery supply device according to claim 12, further comprising a lock state display means for indicating the locking state of the battery.

* * * * *